US008233455B2

(12) United States Patent
Shaheen et al.

(10) Patent No.: US 8,233,455 B2
(45) Date of Patent: *Jul. 31, 2012

(54) WIRELESS COMMUNICATION METHOD AND DEVICE FOR IMPLEMENTING MEDIA INDEPENDENT HANDOVER BETWEEN TECHNOLOGICALLY DIVERSIFIED ACCESS NETWORKS

(75) Inventors: Kamel M Shaheen, King of Prussia, PA (US); Alan G Carlton, Mineola, NY (US); Marian Rudolf, Montreal (CA); Guang Lu, Montreal (CA); Juan Carlos Zuniga, Montreal (CA); Ulises Olvera-Hernandez, Kirkland (CA); Maged M Zaki, San Diego, CA (US)

(73) Assignee: InterDigital Communications Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/815,031

(22) Filed: Jun. 14, 2010

(65) Prior Publication Data

US 2010/0246532 A1 Sep. 30, 2010

Related U.S. Application Data

(63) Continuation of application No. 11/263,206, filed on Oct. 31, 2005, now Pat. No. 7,738,871.

(60) Provisional application No. 60/625,611, filed on Nov. 5, 2004.

(51) Int. Cl.
*H04W 36/00* (2009.01)
*H04W 4/00* (2009.01)

(52) U.S. Cl. ........................................ 370/331; 455/436

(58) Field of Classification Search .................. 455/436, 455/442, 525, 432.1, 405, 408, 558, 406, 455/509, 454–455, 452.2, 510, 511, 512, 455/513, 514, 414.1, 434, 226.4, 82, 67.13, 455/440, 449; 370/328, 395.2, 395.3, 400, 370/395, 345, 469
See application file for complete search history.

(56) References Cited

U.S. PATENT DOCUMENTS 5,561,844 A 10/1996 Jayapalan et al.
(Continued)

FOREIGN PATENT DOCUMENTS

AU 2002/313192 12/2003
(Continued)

OTHER PUBLICATIONS

"3rd Generation Partnership Project; Technical Specification Group Services and Systems Aspects; 3GPP system to Wireless Local Area Network (WLAN) interworking; System description (Release 6)." 3GPP TS 23.234 V6.1.0 (Jun. 2004).

(Continued)

*Primary Examiner* — Melody Mehrpour
(74) *Attorney, Agent, or Firm* — Volpe and Koenig, P.C.

(57) ABSTRACT

A wireless communication method and device may be used to perform a media independent handover between technologically diversified access networks. A wireless transmit/receive unit (WTRU) may be configured to communicate with a plurality of technologically diversified access networks, such as Institute of Electrical and Electronics Engineers (IEEE) 802.X networks and Third Generation Partnership Project (3GPP) networks. The WTRU may include a plurality of access network specific protocol stacks and a media independent handover (MIH) function. The WTRU may be configured to communicate information with each of the plurality of access network specific protocol stacks using protocols specific to each to the plurality of access network protocol stacks.

20 Claims, 31 Drawing Sheets

U.S. PATENT DOCUMENTS

| | | | |
|---|---|---|---|
| 5,737,703 | A | 4/1998 | Byrne |
| 5,889,816 | A | 3/1999 | Agrawal et al. |
| 5,991,626 | A | 11/1999 | Hinz et al. |
| 6,023,461 | A | 2/2000 | Raychaudhuri et al. |
| 6,151,502 | A | 11/2000 | Padovani et al. |
| 6,385,451 | B1 | 5/2002 | Kalliokulju et al. |
| 6,424,639 | B1 | 7/2002 | Lioy et al. |
| 6,526,034 | B1 | 2/2003 | Gorsuch |
| 6,546,425 | B1 | 4/2003 | Hanson et al. |
| 6,577,868 | B1 | 6/2003 | Vialen et al. |
| 6,587,680 | B1 | 7/2003 | Ala-Laurila et al. |
| 6,597,922 | B1 | 7/2003 | Ling et al. |
| 6,651,105 | B1 | 11/2003 | Bhagwat et al. |
| 6,771,962 | B2 | 8/2004 | Saifullah et al. |
| 6,775,533 | B2 | 8/2004 | Kakani et al. |
| 6,804,222 | B1 | 10/2004 | Lin et al. |
| 6,816,730 | B2 | 11/2004 | Davies et al. |
| 6,826,406 | B1 | 11/2004 | Vialen et al. |
| 6,868,256 | B2 | 3/2005 | Dooley et al. |
| 6,879,568 | B1 | 4/2005 | Xu et al. |
| 6,912,389 | B2 | 6/2005 | Bright et al. |
| 6,985,465 | B2 | 1/2006 | Cervello et al. |
| 6,993,335 | B2 | 1/2006 | Natarajan et al. |
| 7,006,481 | B2 | 2/2006 | Terry |
| 7,016,325 | B2 | 3/2006 | Beasley et al. |
| 7,031,280 | B2 | 4/2006 | Segal |
| 7,031,341 | B2 | 4/2006 | Yu |
| 7,046,647 | B2 | 5/2006 | Oba et al. |
| 7,106,714 | B2 | 9/2006 | Spear et al. |
| 7,483,984 | B1 | 1/2009 | Jonker et al. |
| 7,676,226 | B2 * | 3/2010 | Han et al. .......... 455/436 |
| 7,680,081 | B2 | 3/2010 | Kamura et al. |
| 7,899,458 | B2 | 3/2011 | Kakishima et al. |
| 7,917,152 | B2 * | 3/2011 | Alarcon et al. ......... 455/456.1 |
| 2001/0009853 | A1 | 7/2001 | Arimitsu |
| 2001/0034233 | A1 | 10/2001 | Tiedemann et al. |
| 2002/0009998 | A1 * | 1/2002 | Reemtsma .......... 455/449 |
| 2002/0060995 | A1 | 5/2002 | Cervello et al. |
| 2002/0068570 | A1 | 6/2002 | Abrol et al. |
| 2002/0072382 | A1 | 6/2002 | Fong et al. |
| 2002/0131386 | A1 | 9/2002 | Gwon |
| 2002/0173338 | A1 | 11/2002 | Neumann et al. |
| 2002/0188723 | A1 | 12/2002 | Choi et al. |
| 2003/0007490 | A1 | 1/2003 | Yi et al. |
| 2003/0117978 | A1 | 6/2003 | Haddad |
| 2003/0133421 | A1 | 7/2003 | Sundar et al. |
| 2003/0163558 | A1 | 8/2003 | Cao et al. |
| 2003/0169774 | A1 | 9/2003 | Del Prado Pavon et al. |
| 2003/0179731 | A1 | 9/2003 | Noguchi et al. |
| 2003/0193911 | A1 | 10/2003 | Zhao et al. |
| 2003/0224814 | A1 | 12/2003 | Qu et al. |
| 2004/0013102 | A1 | 1/2004 | Fong et al. |
| 2004/0029587 | A1 | 2/2004 | Hulkkonen et al. |
| 2004/0063426 | A1 | 4/2004 | Hunkeler |
| 2004/0097232 | A1 * | 5/2004 | Haverinen .......... 455/436 |
| 2004/0102194 | A1 | 5/2004 | Naghian et al. |
| 2004/0116120 | A1 | 6/2004 | Gallagher et al. |
| 2004/0137902 | A1 | 7/2004 | Chaskar et al. |
| 2004/0147223 | A1 | 7/2004 | Cho |
| 2004/0147262 | A1 | 7/2004 | Lescuyer et al. |
| 2004/0156347 | A1 | 8/2004 | Kim |
| 2004/0165563 | A1 | 8/2004 | Hsu et al. |
| 2004/0165594 | A1 | 8/2004 | Faccin et al. |
| 2004/0208144 | A1 | 10/2004 | Vinayakray-Jani |
| 2004/0240411 | A1 | 12/2004 | Suzuki |
| 2004/0248615 | A1 | 12/2004 | Purkayastha et al. |
| 2004/0253954 | A1 * | 12/2004 | Lee et al. .......... 455/436 |
| 2005/0018637 | A1 | 1/2005 | Karoubalis et al. |
| 2005/0047372 | A1 * | 3/2005 | Yano et al. .......... 370/331 |
| 2005/0157673 | A1 | 7/2005 | Verma et al. |
| 2005/0163078 | A1 | 7/2005 | Oba et al. |
| 2005/0165917 | A1 | 7/2005 | Le et al. |
| 2005/0176473 | A1 | 8/2005 | Melpignano |
| 2005/0185619 | A1 | 8/2005 | Niemela et al. |
| 2005/0201330 | A1 * | 9/2005 | Park et al. .......... 370/331 |
| 2005/0243755 | A1 | 11/2005 | Stephens |
| 2005/0249161 | A1 * | 11/2005 | Carlton .......... 370/331 |
| 2005/0255847 | A1 | 11/2005 | Han et al. |
| 2005/0266880 | A1 | 12/2005 | Gupta et al. |
| 2005/0276240 | A1 | 12/2005 | Gupta et al. |
| 2006/0025169 | A1 | 2/2006 | Maciocco et al. |
| 2006/0092864 | A1 | 5/2006 | Gupta et al. |
| 2006/0092890 | A1 | 5/2006 | Gupta et al. |
| 2006/0099948 | A1 * | 5/2006 | Hoghooghi et al. .......... 455/436 |
| 2006/0104292 | A1 | 5/2006 | Gupta et al. |
| 2006/0153235 | A1 | 7/2006 | Kiernan et al. |
| 2006/0227747 | A1 | 10/2006 | Kim et al. |
| 2007/0030826 | A1 | 2/2007 | Zhang et al. |
| 2011/0069678 | A1 * | 3/2011 | Kiernan et al. .......... 370/331 |

FOREIGN PATENT DOCUMENTS

| | | |
|---|---|---|
| EP | 1349413 | 10/2003 |
| EP | 1435748 | 7/2004 |
| JP | 2003-125433 | 4/2003 |
| RU | 2321172 | 7/2000 |
| WO | 99/09688 | 2/1999 |
| WO | 00/38465 | 6/2000 |
| WO | 03/047296 | 6/2003 |
| WO | 03/065654 | 8/2003 |
| WO | 2004/004373 | 1/2004 |
| WO | 2004/014027 | 2/2004 |
| WO | 2004/077747 | 9/2004 |
| WO | 2005/057968 | 6/2005 |
| WO | 2005/107297 | 11/2005 |

OTHER PUBLICATIONS

"Draft Supplement to Standard for Telecommunications and Information Exchange Between Systems—LAN/MAN Specific Requirements—Part 11: Wireless Medium Access Control (MAC) and physical layer (PHY) specifications: Medium Access Control (MAC) Enhancements for Quality of Service (QoS)." May 2002. IEEE Std 802.11e/D3.0.

"IEEE 802.21 MIHO: Media Independent Handover Functions and Services Specification." Mar. 14, 2004, 21-05-0253-01-0000.

"Information technology—Telecommunications and information exchange between systems—Local and metropolitan area networks—Specific requirements—Part 11: Wireless LAN Medium Access Control (MAC) and Physical Layer (PHY) Specifications." Jun. 12, 2003, ANSI/IEEE Std 802.11, 1999 Edition (R2003).

Johnston, David. "Architectural Elements of an 802 Handoff Solution." May 2003. 802 Handoff Archtecture Elements r1.

Johnston, David. "IEEE 802 Handoff ECSG L2 Triggers." Jan. 2004. 1.2 Triggers dj r1.

Third Generation Partnership Project, "Technical Specification Group Services and Systems Aspects; 3GPP system to Wireless Local Area Network (WLAN) interworking; System Description (Release 6)," 3GPP TS 23.234 V6.6.0 (Sep. 2005).

Carlton et al., "Media Independent Handover Functions and Services Specification," IEEE 802.21 Media Independent Handover (Jan. 9, 2005).

Johnston, David. "802 Handoff Presentation to WNG." Jul. 2003. 00-03-0022-00-0000 Handoff WNG Prsentation r3.

Liu, Xiaoyu. Interaction between L2 and Upper Layers in IEEE 802.21. Mar. 4, 2004. 802.21 L2 Upper Layer Infection r.

Marks, Roger. "Handoff Mechanisms and their Role in IEEE 802 Wireless Standards." Oct. 9, 2002, IEEE T802.16-02/03.

Paine, Richard. "Radio Resource Measurement Requirements and Issues." Oct. 19, 2002. IEEE Submission, Document IEEE 802.11-02/508r10.

Third Generation Partnership Project, "Technical Specification Group Services and System Aspects; 3GPP system to Wireless Local Area Network (WLAN) interworking; System decription (Release 6)," 3GPP TS 23.234 V6.6.0 (Sep. 2005).

"3rd Generation Partnership Project; Technical Specification Group Services and Systems Aspects; Network architecture (Release 6)." 3GPP TS 23.002 V6.5.0 (Jun. 2004).

"3rd Generation Partnership Project; Technical Specification Group Services and Systems Aspects; General Packet Radio Service (GPRS); Service decription; State 2 (Release 5)." 3GPP TS 23.060 V5.9.0 (Sep. 2004).

"3rd Generation Partnership Project; Technical Specification Group Services and Systems Aspects; 3GPP systems to Wireless Local Area Network (WLAN) interworking; System description (Release 6)." 3GPP TS 23.234 V6.1.0 (Jun. 2004).
"3rd Generation Partnership Project; Technical Specification Group Services and Systems Aspects; 3GPP system to Wireless Local Area Network (WLAN) interworking; System description (Release 6)." 3GPP TS 23.234 V6.2.0 (Sep. 2004).
"3rd Generation Partnership Project; Technical Specification Group GSM/EDGE Radio Access Network; Feasibility Study on generic to A/Gb interface (Release 6)." 3GPP TR 43.901 V6.0.0 (Aug. 2004).
"Draft Supplement to Standard for Telecommunications and Information Exchange Between Systems—LAN/MAN Specific Requirements—Part 11: Wireless Medium Access Control (MAC) and physical layer (PHY) specifications: Medium Access Control (MAC) Enhancements for Quality of Service (QoS)" May 2002. IEEE Std 802.11e/D3.0.
"IEEE 802.21 MIHO: Media Independent Handover Functions and Services Specification." Mar. 14, 2004.
"IEEE 802.21 MIHO: Media Independent Handover Functions and Services Specification." Mar. 14, 2004. 21-05-0253-01-0000.
"IEEE P801.21/D00.01 Draft IEEE Standard for Local and Metropolitan Area Networks: Media Independent Hanover Services." IEEE P801.21™/D00.001, Jul. 2005.
"Information technology—Telecommunications and information exchange between systems—Local and metropolitan area networks—Specific requirements—Part 11: Wireless LAN Medium Access Control (MAC) and Physical Layer (PHY) Specifications." Jun. 12, 2003. ANSI/IEEE Std 802.11, 1999 Edition (R2003).
"Unlicensed Mobile Access (UMA); Architecture (Stage 2)." UMA Architecture (Stage 2) R1.0.0 (Sep. 1, 2004).
"Unlicensed Mobile Access (UMA); Protocols (Stage 2)." UMA Protocols(Stage 3) R1.0.0 (Sep. 1, 2004).
"Unlicensed Mobile Access (UMA); User Perspective (Stage 1)." UMA User Perspective (Stage 1) R1.0.0 (Sep. 1, 2004).
Aboba, Bernard. "A Model for Context Transfer in IEEE 802." Apr. 6, 2002.
Arbaugh, William A. "Experimental Handoff Extension of RADIUS." Apr. 23, 2003.
Arbaugh, William A. "Experimental Handoff Extension to Radius." Apr. 23, 2003.
Das, Kaustubh. "Scope and Proposed Work Items for the Handoff Group." May 2003. IEEE P802 Handoff ECSG.
Dommety et al. "Mobile IP Vendor/Organization-Specific Extension." Apr. 2001.
Faccin, Stefano M. "IEEE 802.21 Media Independent Handover." Jan. 10, 2004. 21-04-0169-03-0000.
Gupta, Vivek. "Global Network Neighborhood." May 2004. IEEE 802.21.
Gupta, Vivek. "IEEE 802.21: A Generalized Model for Link Layer Triggers." Mar. 1, 2004.
Gupta, Vivek. IEEE P802.21 Media Independent Handover Mechanisms: Teleconference Meeting Minutes. Jun. 29, 2004. 21-04-0073-00-0000.
Gupta, Vivek. "IEEE P802.21 Media Independent Handover Service Draft Technical Requirements." Sep. 2004.
Gupta, Vivek. "IEEE P802.21 Media Independent Handover Service Draft Technical Requirements." Jul. 12, 2004. 21-04-0087-00-0000.
Gupta, Vivek. "IEEE P802.21 Media Independent Handover Service Draft Technical Requirements." Aug. 17, 2004.
Gupta, Vivek. "IEEE P802.21 Media Independent Handover Service Draft Technical Requirements." Sep. 21, 2004. 21-04-0087-12-0000.
Gupta, Vivek. "IEEE P802.21 Media Independent Handover." Jan. 18, 2005. 21-05-0168-02-0000-MIH.
Gupta, Vivek. "Steps in Handoffs and Use Cases." May 2004. IEEE 802.21.
Gupta, Vivek. "Steps in L2 and L3 Handoffs." Jan. 2004. IEE P802 Handoff ECSG.
Hong, Cheng. "3GPP WLAN Interworking update." Mar. 16, 2004. IEEE 802.11-04/254r0.
Johnston, "Overview of 802.21 Stack Model," IEEE 802.21, XP002461144 (Jul. 12, 2004).
Johnston, David. "802 Handoff Call for Interest—An Expression of Interest." Mar. 2003. IEEE. 802-03/xxxr1.
Johnston, David. "802 Handoff ECSG EC Closing Report." Jul. 2003. IEEE 00-03-0029-04-0000 802 Handoff EC Closing Report.
Johnston, David. "802 Handoff ECSG EC Opening Plenary Report." Nov. 2003. 802 Handoff EC Opening Plenary Report r2
Johnston, David. "802 Handoff Presentation to WNG." Jul. 2003. 00-03-0022-00-0000 Handoff WNG Presentation r3.
Johnston, David. "802.21 L2 Services for Handover Optimization." Mar. 2004. 802.21 IETF DNA r1.
Johnston, David. "802.21 L2.5 Model." Mar. 2004. 802.21 L2.5 Option r1.
Johnston, David. "802.21, L2 Triggers a Strawman Proposal." Mar. 2004. 802.21 IETF Mobopts r1.
Johnston, David. "Architectural Elements of an 802 Handoff Solution." May 2003. 802 Handoff Architecture Elements r1.
Johnston, David. "Handoff Scope Discussion Points." May 2003. 802 Handoff Scope Discussion.
Johnston, David. "IEEE 802 Handoff ECSG L2 Triggers." Jan. 2004. L2 Triggers dj r1.
Johnston, David. "IEEE 802 Handoff Executive Committee Study Group." May 2003. 802 Handoff ECSG Minutes.
Johnston, David. "Improved Stack Diagram" Mar. 12, 2003. IEEE C802.16REVd-04/XX.
Koodli, R. "Fast Handovers for Mobile IPv6." Originally Published Jun. 2004; Republished Jul. 2005.
Kwak, Joe. "Handoff Functional Elements: An analysis of typical mobile systems." Nov. 11, 2002.
Kwak, Joe. "RRM Study Group: Big Picture Issues." Sep. 10, 2002. IEEE Submission, Document: IEEE 802.11-557r0.
Kwak, Joe. "RRM Study Group: Big Picture Issues." Sep. 10, 2002. IEEE Submission, Document: IEEE 802.11-557r1.
Kwak, Joe. "WLAN Handoff Scenarios: Example Handoffs with RRM Measurements and Network Assistance." Mar. 2003. IEEE Submission, Document: IEEE 802.11-03/225r0.
Lee, Young J. "An Strategy for interworking between WLAN and cdma2000." Nov. 2003. IEEE 802.11-00/xxx.
Lee, Young J. "IEEE P802.11 Wireless LANs: The Strategy for interworking between WLAN and cdma2000." Nov. 10, 2003. IEEE 802.11-00/xxx.
Lin, Huai-An (Paul). "Handoff for Multi-interfaced 802 Mobile Devices." May 2003. IEEE P802 Handoff ECSG.
Lin, Huai-An (Paul). "IEEE P802 Handoff ECSG: Handoff for Multi-interfaced 802 Mobile Devices." May 12, 2003.
Lin, Paul. "Proposed Problem and Scope Statements for Handoff ECSG." May 2003. IEEE P802 Handoff ECSG.
Liu, Xiaoyu. Interaction between L2 and Upper Layers in IEEE 802.21. Mar. 4, 2004. 802.21 L2 Upper Layer Interaction r.
Malki, El. K. "Low Latency Handoffs in Mobile IPv4." Jun. 2004.
Marks, Roger. "Handoff Mechanisms and their Role in IEEE 802 Wireless Standards." Oct. 9, 2002 IEEE T802.16-02/03.
McCann, P. "Mobile IPv6 Fast Handovers for 802.11 Networks." Jul. 2004.
Natarajan, Nat. "Support of Layer 2 Triggers for Faster Handoffs." Nov. 10, 2003. IEEE P802.20-03/95.
Paine, Richard. "Radio Resource Measurement Issues." Jan. 16, 2003. IEEE Submission, Document: IEEE 802.11-03/134r0.
Paine, Richard. "Radio Resource Measurement Requirements and Issues." Oct. 19, 2002. IEEE Submission, Document: IEEE 802.11-02/508r10.
Paine, Richard. "Radio Resource Measurement: 802 Handoff Measurement Considerations." Mar. 2003 IEEE 802.11-03/125r4.
Park, Soohong Daniel. "Access Router Identifier (ARID) for supporting L3 mobility." Jul. 2004. IEEE 802.11-04/710r0.
Park, Soohong Daniel. "Awareness of the handover to be distinguished from a L2 or L3." Mar. 2004. 21-04-0002-00-0000-awareness handover L2$L3.ppt.
Park, Soohong Daniel. "Awareness of the handover to be distinguished from a L2 or L3." Mar. 2004. IEEE P802.21 Handoff.
Rajkumar, Ajay. "Mobile-Initiated Handoff Amongst Disparate WLAN and Cellular Systems." May 13, 2003.
Sachs et al. "IEEE 802.21 Media Independent Handover—Generic Link Layer Concept." IEEE Submission, Sep. 9, 2004.
Shyy, Dong-Jye. "IEEE 802.21 WG—Suggested Architectures for Different Handover Scenarios." Mar. 2004. IEEE 802.21-04/xxxr0.

Shyy, Dong-Jye. "IEEE P802.21 Media Independent Handover Service: Draft Technical Requirements." Mar. 18, 2004. IEEE802.21-04/00xx-00.

Soliman et al. "Hierarchical Mobile IPv6 mobility management (HMIPv6)." Originally Published Jun. 15, 2004; Republished Dec. 2004.

Tan, TK. "Wireless Interworking Group." Nov. 11, 2002. IEEE 802.11-xxx.

Third Generation Partnership Project, "Technical Specification Group Services and Systems Aspects; Network Architecture (Release 6)," 3GPP TS 23.002 V6.9.0 (Sep. 2005).

Third Generation Partnership Project, "Technical Specification Group Services and Systems Aspects; General Packet Radio Service (GPRS); Service Description; State 2 (Release 1999)," 3GPP TS 23.060 V3.16.0 (Dec. 2003).

Third Generation Partnership Project, "Technical Specification Group Services and Systems Aspects; General Packet Radio Service (GPRS); Service Description; State 2 (Release 4)," 3GPP TS 23.060 V4.9.0 (Dec. 2003).

Third Generation Partnership Project, "Technical Specification Group Services and Systems Aspects; General Packet Radio Service (GPRS); Service Description; State 2 (Release 4)," 3GPP TS 23.060 V4.10.0 (Sep. 2005).

Third Generation Partnership Project, "Technical Specification Group Services and Systems Aspects; General Packet Radio Service (GPRS); Service Description; State 2 (Release 5)," 3GPP TS 23.060 V5.11.0 (Sep. 2005).

Third Generation Partnership Project, "Technical Specification Group Services and Systems Aspects; General Packet Radio Service (GPRS); Service Description; State 2 (Release 6)," 3GPP TS 23.060 V6.6.0 (Sep. 2004).

Third Generation Partnership Project, "Technical Specification Group Services and Systems Aspects; General Packet Radio Service (GPRS); Service Description; State 2 (Release 6)," 3GPP TS 23.060 V6.10.0 (Sep. 2005).

Third Generation Partnership Project, "Technical Specification Group Services and System Aspects; 3GPP system to Wireless Local Area Network (WLAN) interworking; System description (Release 6)," 3GPP TS 23.234 V6.6.0 (Sep. 2005).

Williams, Michael Glenn. "IEEE P802 Wired and Wireless LANs Handoff: Tentative Minutes of the IEEE P802 Handoff Executive Committee Study Group." Jan. 13, 2004. 00-04-00XX-00-0000.

Williams, Michael Glenn. "IEEE P802 Wired and Wireless LANs Handoff: Tentative Minutes of the IEEE P802 Handoff Executive Committee Study Group." Jan. 14, 2004. 00-04-00XX-00-0000.

Williams, Michael Glenn. "IEEE P802 Wired and Wireless LANs Handoff: Tentative Minutes of the IEEE P802.21 Working Group." Mar. 18, 2004. 00-04-00XX-00-0000.

Williams, Michael Glenn. "IEEE P802 Wired and Wireless LANs Handoff: Tentative Minutes of the IEEE P802 Handoff Executive Committee Study Group." Nov. 10, 2003. 00-03-00XX-00-0000.

Williams, Michael Glenn. "IEEE P802 Wired and Wireless LANs Handoff: Tentative Minutes of the IEEE P802.21 Working Group." Mar. 16, 2004. 00-04-00XX-00-0000.

Williams, Michael Glenn. "Media Independent Handover: Use Cases and Architecture Discussion Stimulus." Jan. 2004. IEEE 802.21.

Williams, Michael Glenn. IEEE P802 Wired and Wireless LANs Handoff: Tentative Minutes of the IEEE P802 Handoff Executive Committee Study Group. Jul. 22, 2003. IEEE 802.11-03/319r0-0023.

Williams, Michael Glenn. IEEE P802 Wired and Wireless LANs Handoff: Tentative Minutes of the IEEE P802 Handoff Executive Committee Study Group. Jul. 24, 2003. IEEE 802.11-03/319r000-03-0028-00-0000.

Williams, Michael Glenn. IEEE P802 Wired and Wireless LANs Handoff: Tentative Minutes of the IEEE P802 Handoff Executive Committee Study Group. Sep. 8, 2003. IEEE 00-03-0032-00-0000.

Wu, Gang. "Fast handoff for Mobile IP and Link Layer Triggers." May 2003. P802-Handoff-03-xxxr0-ECSG.

Wu, John Chiung-Shien et al. "Intelligent Handoff for Mobile Wireless Internet." 2001.

"3$^{rd}$ Generation Partnership Project; Technical Specification Group Services and Systems Aspects; Network architecture (Release 6)." 3GPP TS 23.002 V6.5.0 (Sep. 2004).

"3$^{rd}$ Generation Partnership Project; Technical Specification Group Services and Systems Aspects; General Packet Radio Service (GPRS); Service description; State 2 (Release 5)." 3GPP TS 23.060 V5.9.0 (Sep. 2004).

"3$^{rd}$ Generation Partnership Project; Technical Specification Group Services and Systems Aspects; 3GPP system to Wireless Local Area Network (WLAN) interworking; System description (Relese 6)." 3GPP TS 23.234 V6.10 (Jun. 2004).

"3$^{rd}$ Generation Partnership Project; Technical Specification Group GSM/EDGE Radio Access Network; Feasibility Study on generic access to A/Gb interface (Release 6)." 3GPP TR 43.901 V6.0.0 (Aug. 2004).

"Draft Supplement to Standard for Telecommunications and Information Exchange Between Systems—LAN/MAN Specific Requirements—Part 11: Wireless Medium Access Control (MAC) and physical layer (PHY) specifications: Medium Access Control (MAC) Enhancements for Quality of Service (QoS)." May 2002. IEEE Std. 802.11e/D3.0.

"IEEE P801.21/D00.01 Draft IEEE Standard for Local and Metropolitan Area Networks: Media Independent Handover Services." IEEE P801.21™/D00.001, Jul. 2005.

"Information technology—Telecommunications and information exchange between systems—Local and metropplitan area networks—Specifics requirements—Part 11: Wireless LAN Medium Access Control (MAC) and Physical Layer (PHY) Specifications." Jun. 12, 2003. ANSI/IEEE Std 802.11, 1999 Edition (R2003).

Carlton et al., "Media Independent Handover Functions and Services Specification," IEEE 802.21 Media Independent Hanover (Jan. 9, 2005).

IEEE P802.21/D00.03, Draft IEEE Standard for Local and Metropolitan Area Networks: Media Independent Handover Services, IEEE P802.21/D00.03 (Oct. 2005).

Johnston, David. "802 Handoff Call for Interest—An Expression of Interest." Mar. 2003. IEEE 802-03/xxxr1.

Johnston, David. "802 Handoff ECSG EC Opening Plenary Report." Nov. 2003. 802 Handoff EC Opening Plenary Report r2.

Kwak, Joe. "RRM Study Group: Big Picture Issues." 10 Sep. 2002. IEEE Submission, Document: IEEE 802.11-557r0.

Marks, Roger. "Handoff Mechanisms and their Role in IEEE 802 Wireless Standards." Oct. 9, 2002. IEEE T802.16-02/03.

Paine, Richard. "Radio Resource Measurement: 802 Handoff Measurement Considerations." Mar. 2003. IEEE 802.11-03/125r4.

Park, Soohong Daniel. "Awareness of the handover to be distinguished from a L2 or L3." Mar. 2004. IEEE.P802.21 Handoff.

* cited by examiner

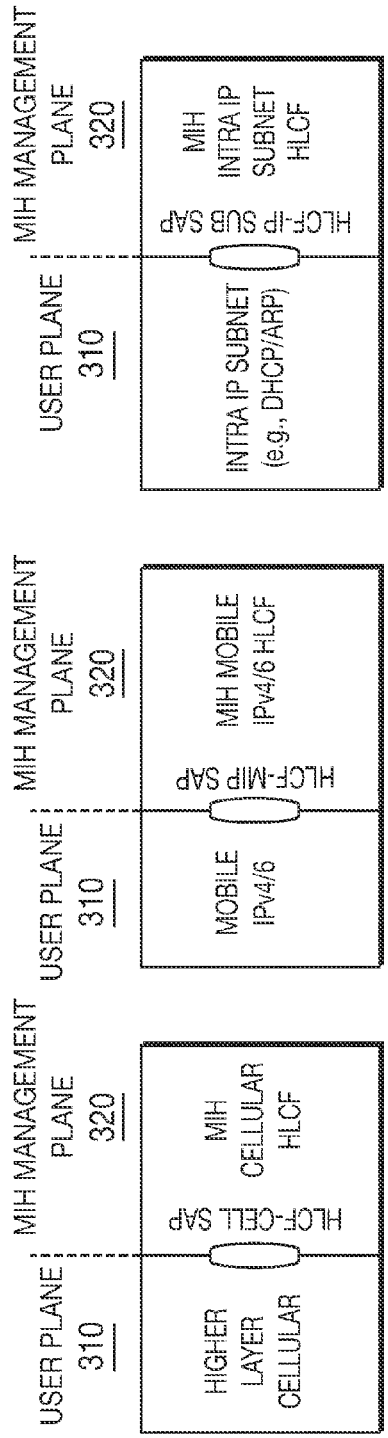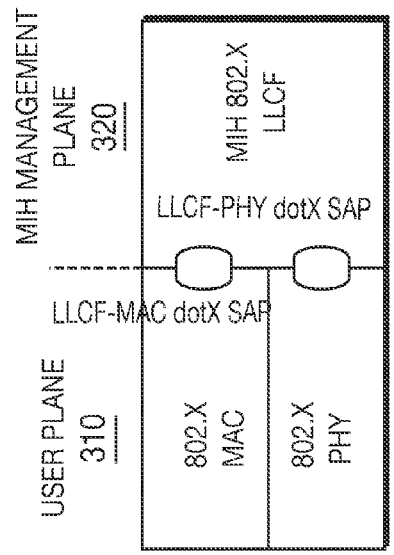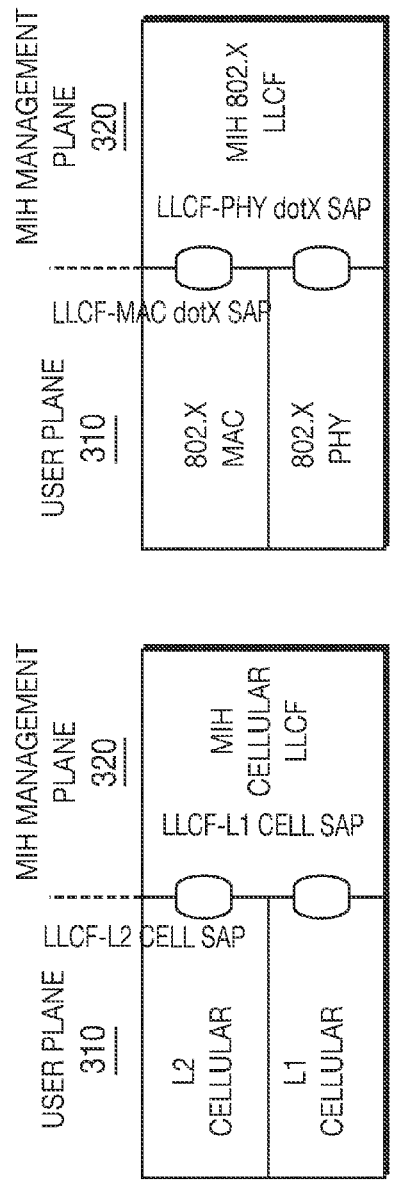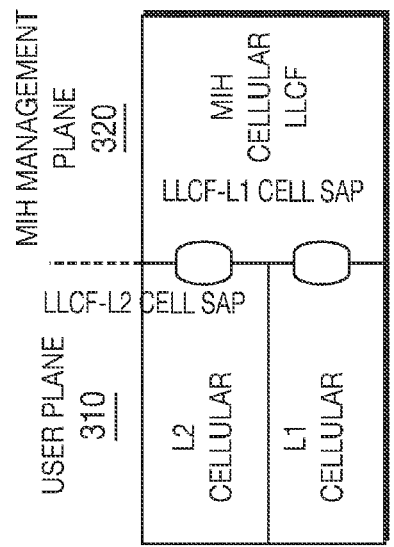

WIRELESS COMMUNICATION METHOD AND DEVICE FOR IMPLEMENTING MEDIA INDEPENDENT HANDOVER BETWEEN TECHNOLOGICALLY DIVERSIFIED ACCESS NETWORKS

CROSS REFERENCE TO RELATED APPLICATIONS

This application is a continuation of U.S. Pat. No. 7,738, 871 filed on Oct. 31, 2005, which claims the benefit of U.S. Provisional Patent Application No. 60/625,611 filed Nov. 5, 2004, which are hereby incorporated by reference.

TECHNOLOGY FIELD

The present invention is related to wireless communication systems. More particularly, the present invention is related a method and system for implementing media independent handovers (MIHs) among technologically diversified access networks (ANs).

BACKGROUND

Different types of wireless communication systems have been developed to provide different types of services. Some examples of the wireless communication systems include wireless local area network (WLAN), wireless wide area network (WWAN) and cellular networks such as universal mobile telecommunication systems (UMTS). Each of these systems have been developed and tailored to provide specific applications.

With the pervasive adoption of wireless communication networks in enterprise, residential and public domains, continuous connectivity can be supported as the users of such networks move from one network to the other. With the emerging "always-on" life style, wireless transmit/receive units (WTRUs), (i.e., mobile stations (MS)), are required to support multiple heterogeneous networks. Thus, a seamless handover between these networks is desired.

SUMMARY

A wireless communication method and device may be used to perform a media independent handover between technologically diversified access networks. A wireless transmit/receive unit (WTRU) may be configured to communicate with a plurality of technologically diversified access networks, such as Institute of Electrical and Electronics Engineers (IEEE) 802.X networks and Third Generation Partnership Project (3GPP) networks. The WTRU may include a plurality of access network specific protocol stacks and a media independent handover (MIH) function. The WTRU may be configured to communicate information with each of the plurality of access network specific protocol stacks using protocols specific to each to the plurality of access network protocol stacks.

BRIEF DESCRIPTION OF THE DRAWINGS

A more detailed understanding of the invention may be had from the following description, given by way of example and to be understood in conjunction with the accompanying drawings wherein:

FIGS. 7A, 7B, 7C, 8A and 8B show external service access points (SAPs) in accordance with the present invention;

DETAILED DESCRIPTION

Figure 1:
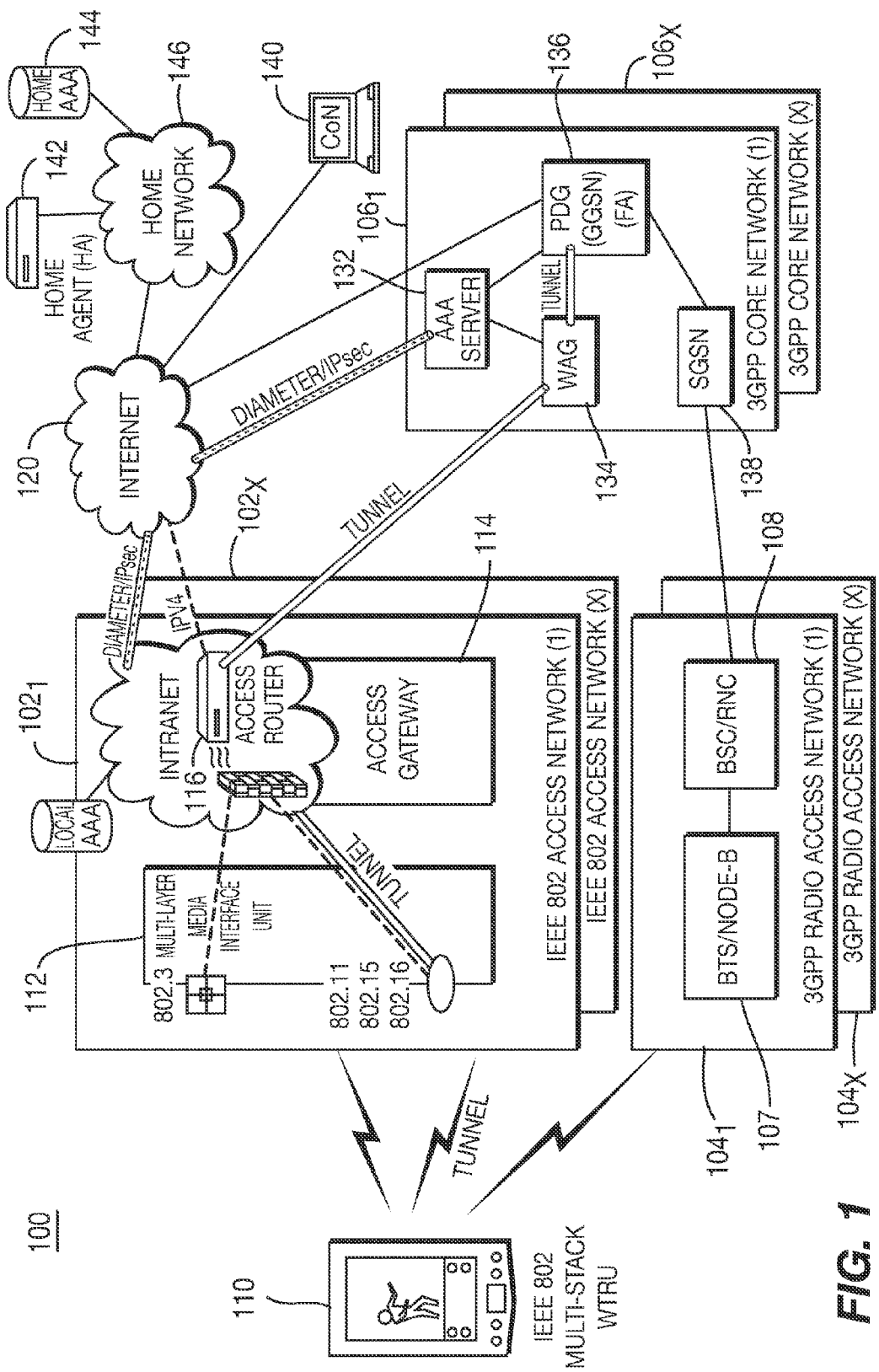
FIG. 1 is a block diagram of a wireless communication system configured in accordance with the present invention.

Hereafter, the terminology "wireless transmit/receive unit" (WTRU) includes but is not limited to, a mobile station (MS), a user equipment (UE), a fixed or mobile subscriber unit, a pager, or any other type of device capable of operating in a wired or wireless environment.

| ACRONYMS AND DEFINITIONS | |
|---|---|
| 3G | Third Generation |
| 3GPP | 3G Partnership Project |
| AAA | Authentication, Authorization, and Accounting |
| AG | Access Gateway |

-continued

ACRONYMS AND DEFINITIONS

| | |
|---|---|
| AN | Access Network |
| AP | Access Point |
| AR | Access Router |
| BS | Base Station |
| BSC | Base Station Controller |
| BSSID | Basic Service Set Identifier |
| BTS | Base Transceiver Station |
| BU | Binding Update |
| ESS | Extended Service Set |
| CoA | Care of Address |
| CoN | Correspondent Node |
| CN | Core Network |
| CVSE | Critical Vendor/Organization Specific Extensions |
| ESSID | Extended Service Set ID |
| FA | Foreign Agent |
| FBU | Fast-Binding Update |
| F-HMIP | Fast Handover for Hierarchical Mobile IP |
| FMIP | Fast Handover Mobile IP |
| FNA | Fast Neighbor Advertisement |
| GGSN | Gateway GPRS Support Node |
| GPRS | General Packet Radio Service |
| GSM | Global System for Mobile Communication |
| GTP | GPRS Tunneling Protocol |
| HLCF | Higher Layer Convergence Function |
| HA | Home Agent |
| HAck | Handover Acknowledge |
| HI | Handover Initiate |
| HMIP | Hierarchical Mobile IP |
| HO | Handover |
| HOF | Handover Function |
| IEEE | Institute of Electrical and Electronics Engineers |
| IETF | Internet Engineering Task Force |
| ICMP | Internet Control Message Protocol |
| IP | Internet Protocol |
| ISP | Internet Service Provider |
| L1 | Physical Layer (PHY) |
| L2 | Medium Access Control (MAC) layer and Logical Link Control (LLC) |
| L3 | Layer 3 |
| L2TP | L2 Tunneling Protocol |
| L3SH | L3 Soft Handover |
| LAN | Local Area Network |
| LCoA | On-Link Care of Address |
| LLC | Logical Link Control |
| LLCF | Lower Layer Convergence Function |
| MA | Media Access |
| MAC | Medium Access Control |
| MAP | Mobility Anchor Point |
| MIH | Media Independent Handover |
| MIHO | Media Independent Handover |
| MIHS | Media Independent Handover Services |
| MIP | Mobile IP |
| MLME | MAC Layer Management Entity |
| MN | Mobile Node |
| MS | Mobile Station |
| MT | Mobile Terminal |
| NVSE | Normal Vendor/Organization Specific Extensions |
| PDG | Packet Data Gateway |
| PHY | Physical Layer |
| PLMN | Public Land Mobile Network |
| QoS | Quality of Service |
| RCoA | Regional Care of Address |
| RFC | Request for Comment |
| RNC | Radio Network Controller |
| SAP | Service Access Point |
| SGSN | Serving GPRS Support Node |
| SNR | Signal Noise Ratio |
| TCP | Transmission Control Protocol |
| UDP | User Datagram Protocol |
| UE | User Equipment |
| UMTS | Universal Mobile Telecommunications System |
| WAG | Wireless Access Gateway |
| WLAN | Wireless Local Area Network |
| WPAN | Wireless Personal Area Network |
| WMAN | Wireless Metropolitan Area Network |
| WTRU | Wireless Transmit/Receive Unit |

FIG. 1 is a block diagram of a wireless communication system 100 configured in accordance with the present invention. The wireless communication system 100 includes a plurality of ANs $102_1$-$102_x$, $104_1$-$104_x$ deployed concurrently under different standards and a plurality of Third Generation Partnership Project (3GPP) core networks (CN) $106_1$-$106_x$. An IEEE 802 multi-stack WTRU 110 may access any of the ANs $102_1$-$102_x$, $104_1$-$104_x$ while performing handover between the ANs $102_1$-$102_x$, $104_1$-$104_x$. The ANs $102_1$-$102_x$, $104_1$-$104_x$ include, but are not limited to, IEEE 802 ANs $102_1$-$102_x$ and 3GPP radio access networks (RANs) $104_1$-$104_x$. The IEEE 802 ANs $102_1$-$102_x$ may operate under IEEE 802.3, IEEE 802.11, IEEE 802.15 and IEEE 802.16 standards. Hereinafter, the present invention will be explained with reference to IEEE 802 ANs and a 3GPP RAN, but the present invention is applicable to any other types or ANs.

Each of the 3GPP RANs $104_1$-$104_x$ includes a base transceiver station (BTS)/Node-B 107 and a base station controller (BSC)/radio network controller (RNC) 108. The BSC/RNC 107 is connected to one of a plurality of 3GPP core networks (CN) $106_1$-$106_x$. The IEEE 802 ANs $102_1$-$102_x$ comprise a multi-layer media interface unit 112 and an access gateway 114. The multi-layer media interface unit 112 performs physical layer functions and medium access control (MAC) layer functions. The access gateway 114 is a unified interface to external networks, such as the Internet 120 or the 3GPP CNs $106_1$-$106_x$. The access gateway 114 includes an access router 116 for routing data packets to and from the external networks. Therefore, the IEEE 802 multi-stack WTRU 110 may communicate with a CoN 140 over the Internet 120. The IEEE 802 multi-stack WTRU 110 may also communicate with a home agent (HA) 142 and a home authentication, authorization and accounting (AAA) server 144 via a home network 146.

Each of the 3GPP CNs $106_1$-$106_x$ include an AAA server 132, a WLAN access gateway (WAG) 134, a PDG/gateway general packet radio service (GPRS) serving node (GGSN)/foreign agent (FA) 136 and a serving GPRS support node (SGSN) 138. The GGSN and PDG may function as FAs when IPV4 needs to be supported. The PDG may be implemented off an existing GGSN using a subset of a GGSN function and a tunnel termination point. The WAG 134 is a gateway via which the data to and from the access router 116 in the ANs $102_1$-$102_x$ is routed to provide the IEEE 802 multi-stack WTRU 110 with 3GPP services. The 3GPP AAA server 132 provides AAA services for the IEEE 802 multi-stack WTRU 110. The PDG 136 is a gateway for 3GPP packet switching (PS)-based services.

Figure 2:
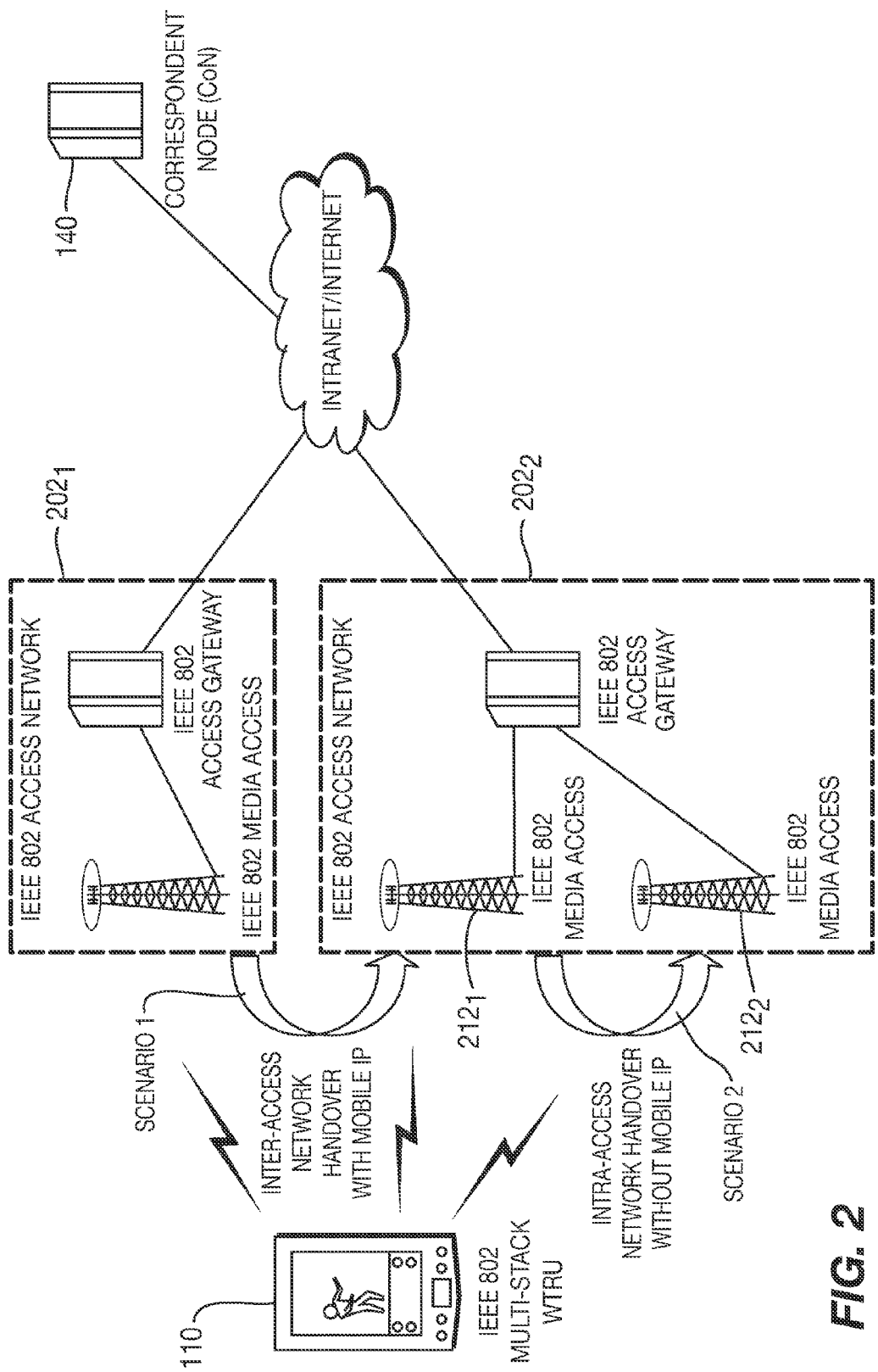
FIG. 2 illustrates inter-AN and intra-AN handovers in accordance with the present invention.

FIG. 2 illustrates two different handover scenarios which are implemented in accordance with the present invention. In FIG. 2, two different IEEE 802 ANs $202_1$, $202_2$ are deployed. In a first scenario, a mobile Internet protocol (MIP) handover is implemented between the IEEE 802 multi-stack WTRU 110 and two different ANs $202_1$, $202_2$. In a second scenario, a handover is implemented between the IEEE 802 multi-stack WTRU 110 and two different IEEE 802 media access (MA) entities $212_1$, $212_2$ within the same IEEE 802 AN $202_2$. In the second case, since mobility can be handled below layer 3, MIP is not required.

Figure 3:
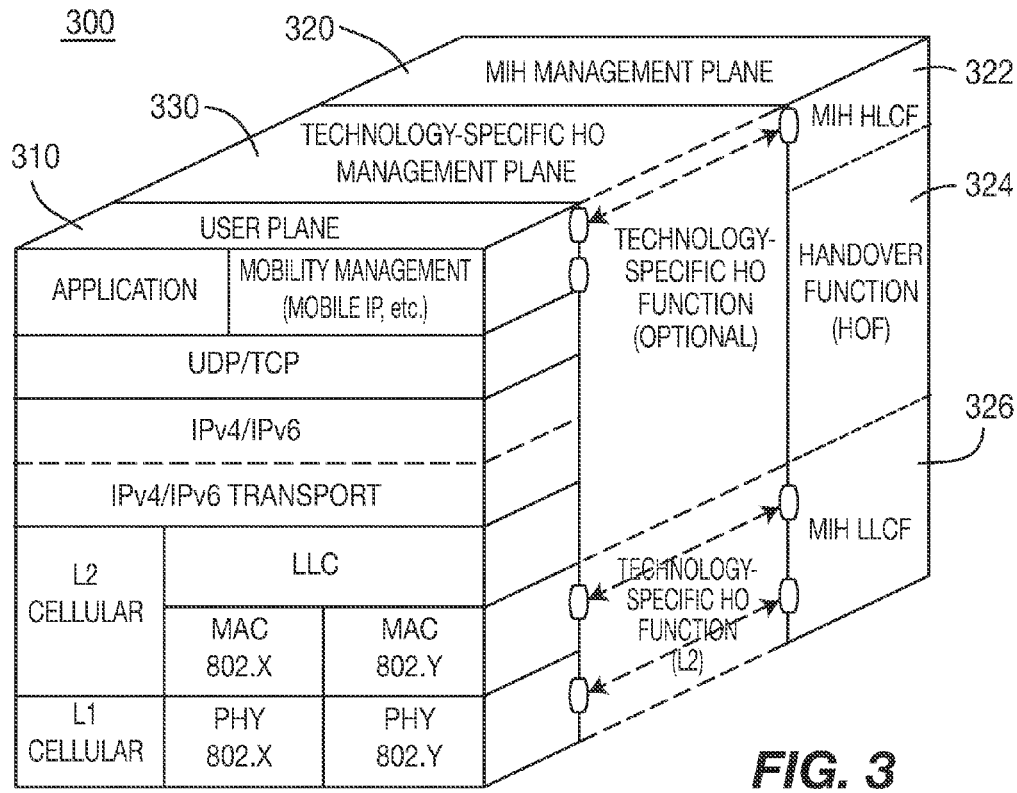
FIG. 3 shows a protocol stack configured in accordance with the present invention.

FIG. 3 shows a protocol stack 300 configured in accordance with the present invention. The protocol stack includes a user plane 310 and a separate MIH management plane 320 for performing an MIH operation. The MIH management plane 320 is parallel to the user plane 310.

The MIH management plane 320 includes an MIH higher layer convergence function (HLCF) 322, a handover function (HOF) 324 and an MIH lower layer convergence function (LLCF) 326. The MIH HLCF 322 provides an interface between the MIH handover plane 320 and the mobility management entity in a particular technology. The HOF 324 collects handover events from the MIH LLCF 326 and determines whether a handover is required based on certain criteria, (e.g., link quality, service and subscription). The MIH LLCF 326 provides an event service that compiles physical layer (PHY) and MAC layer events specific to a particular technology. The event service can be configured in order to determine a set of MAC and PHY measurements that need to be collected. When certain events or a collection of them meet certain configured criteria, (e.g., a signal-to-noise ratio (SNR) threshold), an event indication is generated. The MIH HLCF 322 and the MIH LLCF 326 are implementation specific and it should be noted that any description of the MIH HLCF and the MIH LLCF in the present invention is provided as an example, not as a limitation, and any other variations are possible.

As illustrated in FIG. 3, the MIH management plane 320 may co-exist with other technology-specific handover (HO) function 330, (e.g., IEEE 802.11r intra-ESS fast handover or IEEE 802.16 Netman mobility functions). When no other handover entity exists, handover triggers from PHY and MAC are sent to the MIH LLCF 326 directly. When the MIH handover plane 320 co-exists with the technology-specific HO management plane 330, a two-tier handover method is used, which is implementation specific. For example, one handover management entity may take control of the handover procedures or a combination of functions from both entities may be implemented.

Figure 4:
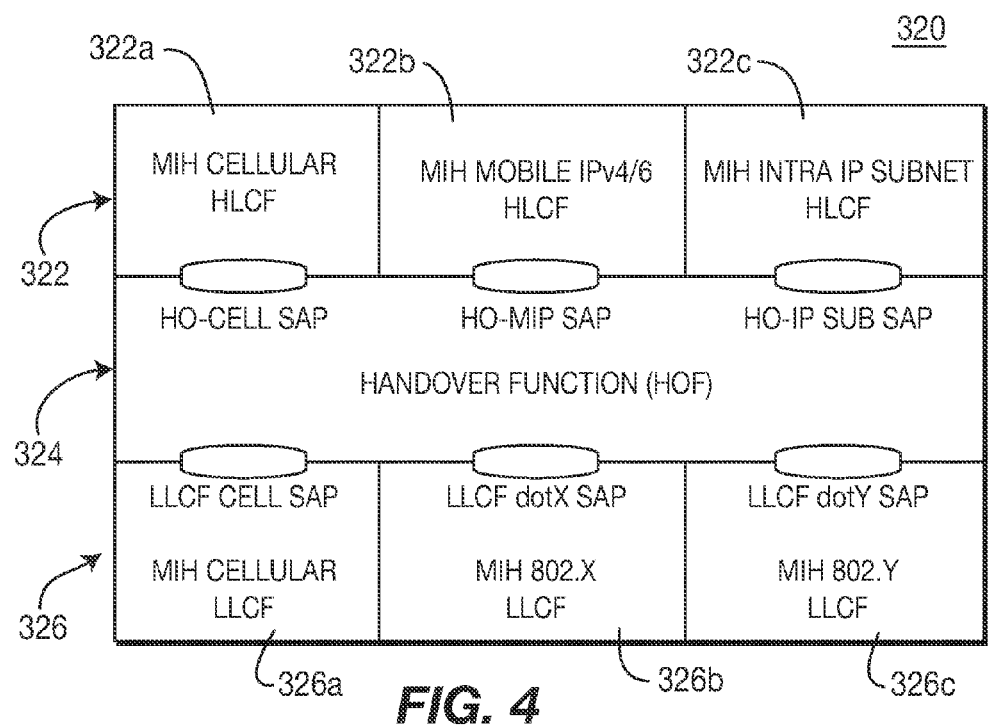
FIG. 4 shows a media independent handover (MIH) management plane in accordance with the present invention.

FIG. 4 shows a detailed MIH management plane 320 in accordance with the present invention. The MIH handover plane 320 interfaces with the system at both higher and lower layers through convergence functions. These convergence functions are system-specific and multiple functions may be present in order to support all system-specific features.

Preferably, multiple MIH HLCFs 322 and MIH LLCFs 326 are provided. For example, an MIH cellular HLCF 322a for interfacing with a cellular system, an MIH mobile IP HLCF 322b for mobile IP interactions and an MIH intra-IP subnet HLCF 322c for handover within the same IP subnet for HLCF, and an MIH cellular LLCF 326a for a cellular system and an MIH 802.X LLCF 326b, 326c for IEEE 802 systems for LLCF.

Figure 5:
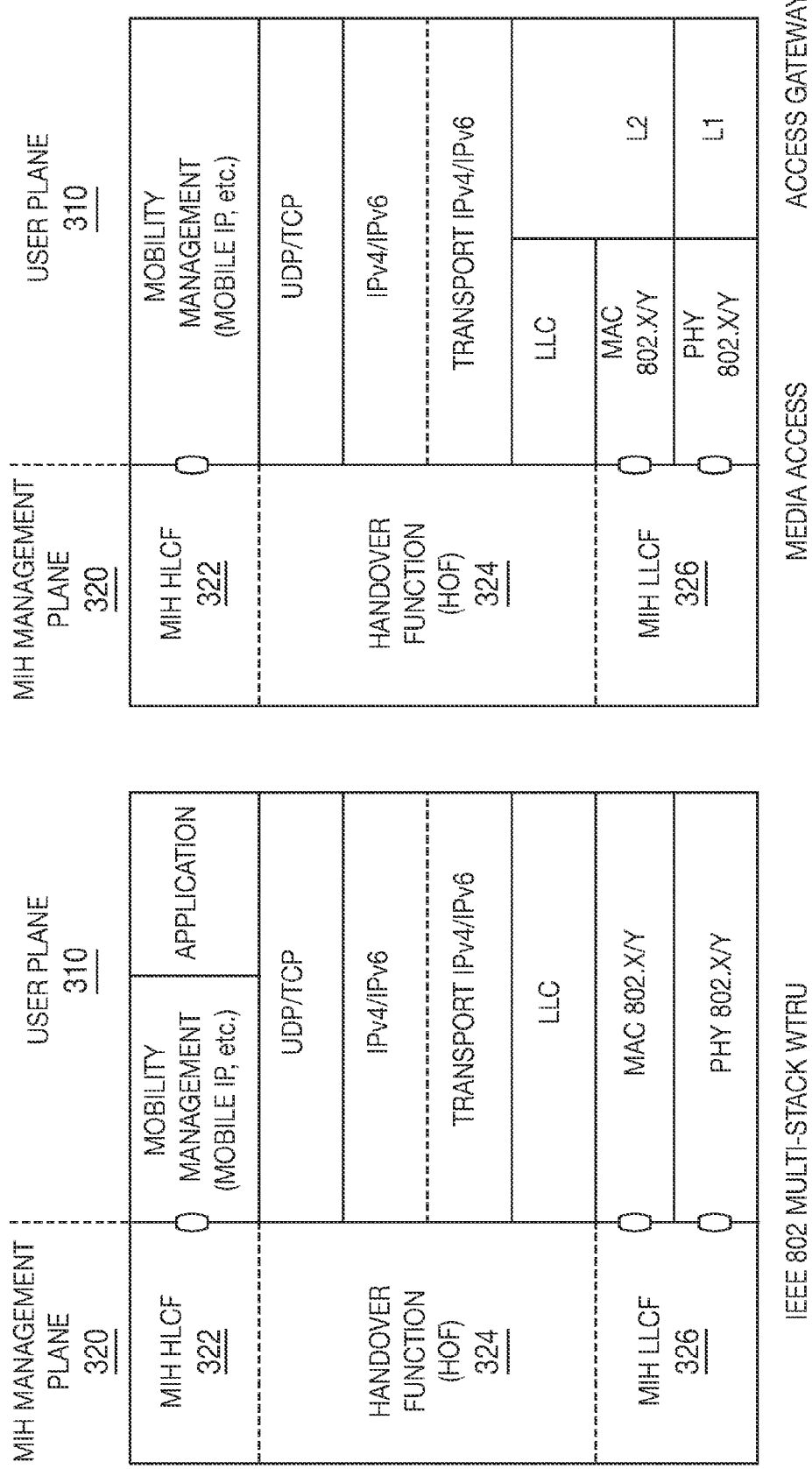
FIGS. 5A and 5B show protocol stacks of a multi-stack WTRU and the media access in accordance with the present invention.

FIGS. 5A and 5B show protocol stacks of the IEEE 802 multi-stack WTRU 110 and an IEEE 802 AN in accordance with the present invention. As stated above, an MIH management plane is provided in parallel to the user plane both in the IEEE 802 multi-stack WTRU 110 and the AN and the MIH LLCF interfaces to MAC and PHY layers and the MIH HLCF interfaces to higher layer applications.

Figure 6:
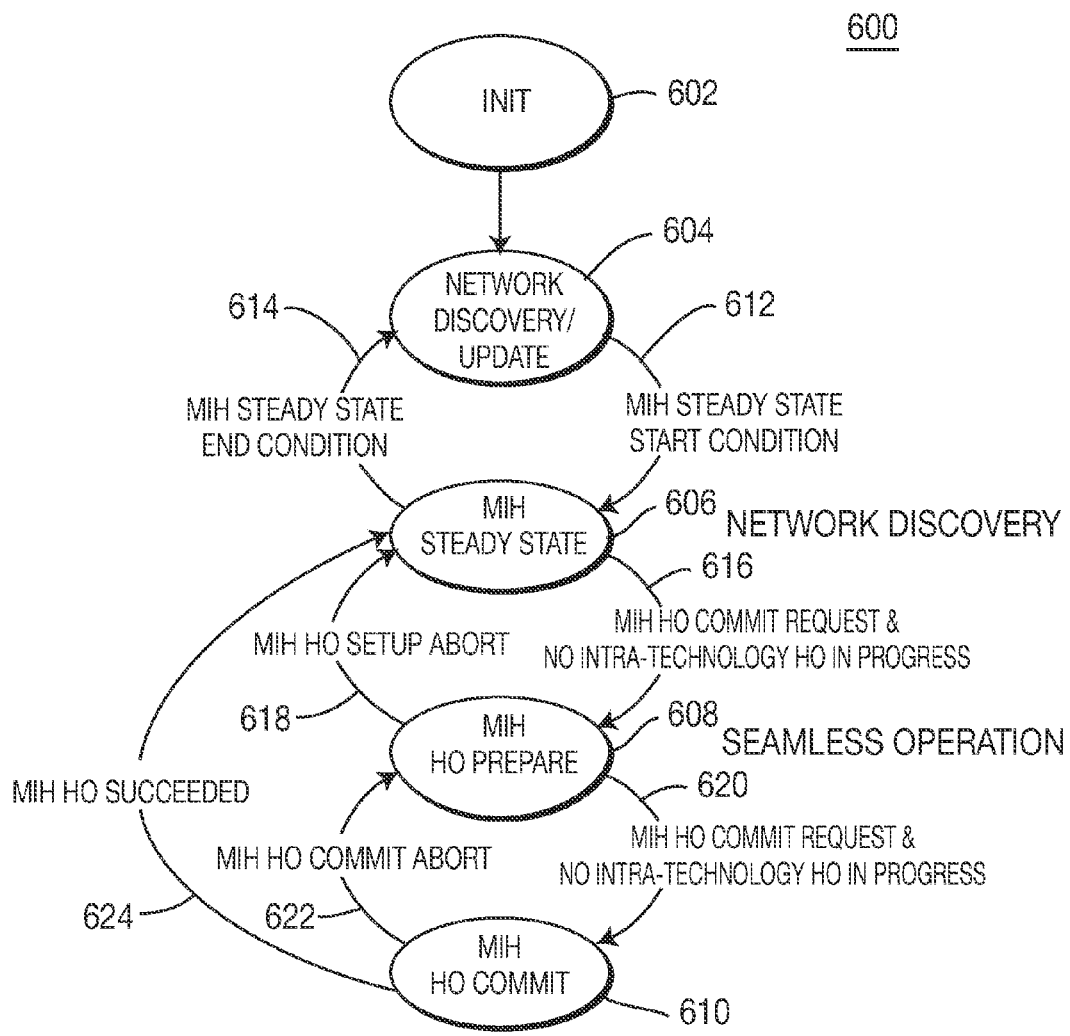
FIG. 6 shows an MIH state machine in accordance with the present invention.

FIG. 6 shows an MIH state machine 600 in accordance with the present invention. The MIH state machine 600 is applicable to both a network and a WTRU and whether the handover is network initiated or WTRU initiated. Five states are defined as follows: an initialization state 602, a network discovery/update state 604, an MIH steady state 606, an MIH handover prepare state 608 and an MIH handover commit state 610.

In the initialization state 602, handover configuration parameters are initialized and then a transition is made to the network discovery/update state 604. In the network discovery/update state 604, the MIH management plane 320 gathers information about system conditions and network topology including neighbor lists from different technology. A transition to the MIH steady state 606 is made when an MIH steady state start condition is met (step 612) and a transition is made back to the network discovery/update 604 when an MIH steady state end condition is met (step 614). During operation, the MIH management plane 320 performs network updates to get the latest system conditions. The MIH steady state 606 represents the state when the link condition is good and there is no need to perform handover. However, network discovery can be performed in background to get the latest neighbor list conditions.

Upon receiving an MIH handover request, if there is no intra-technology handover in progress, a transition to an MIH handover prepare state 608 is made to prepare a new link (step 616). Preferably, the new link is established without releasing the established link, (i.e., make before break). If the MIH handover setup is aborted (step 618), the MIH goes back to the MIH steady state 606. If MIH handover preparation is accomplished properly, the MIH makes a transition to an MIH handover commit state 610 as long as there is no intra-technology handover in progress (step 620). If the MIH handover is successfully performed (step 624), the MIH makes a transition back to the MIH steady state 606. However, if the MIH handover is aborted (step 622), the MIH makes a transition back to the MIH handover prepare state 608.

The information flow across the boundaries between the layers is described in terms of service access points (SAPs), which are defined by primitives that represent different items of information and cause actions to take place. Since there are several sublayers, SAPs are divided into those providing MIH handover services to the MIH HLCFs, the ones providing MIH handover services to the MIH LLCFs, and a set of services provided to the external layers, (non-IEEE standards layers), by each one of the specific convergence functions. FIGS. 7A-7C, 8A and 8B show external SAPs in accordance with the present invention.

Figure 9:
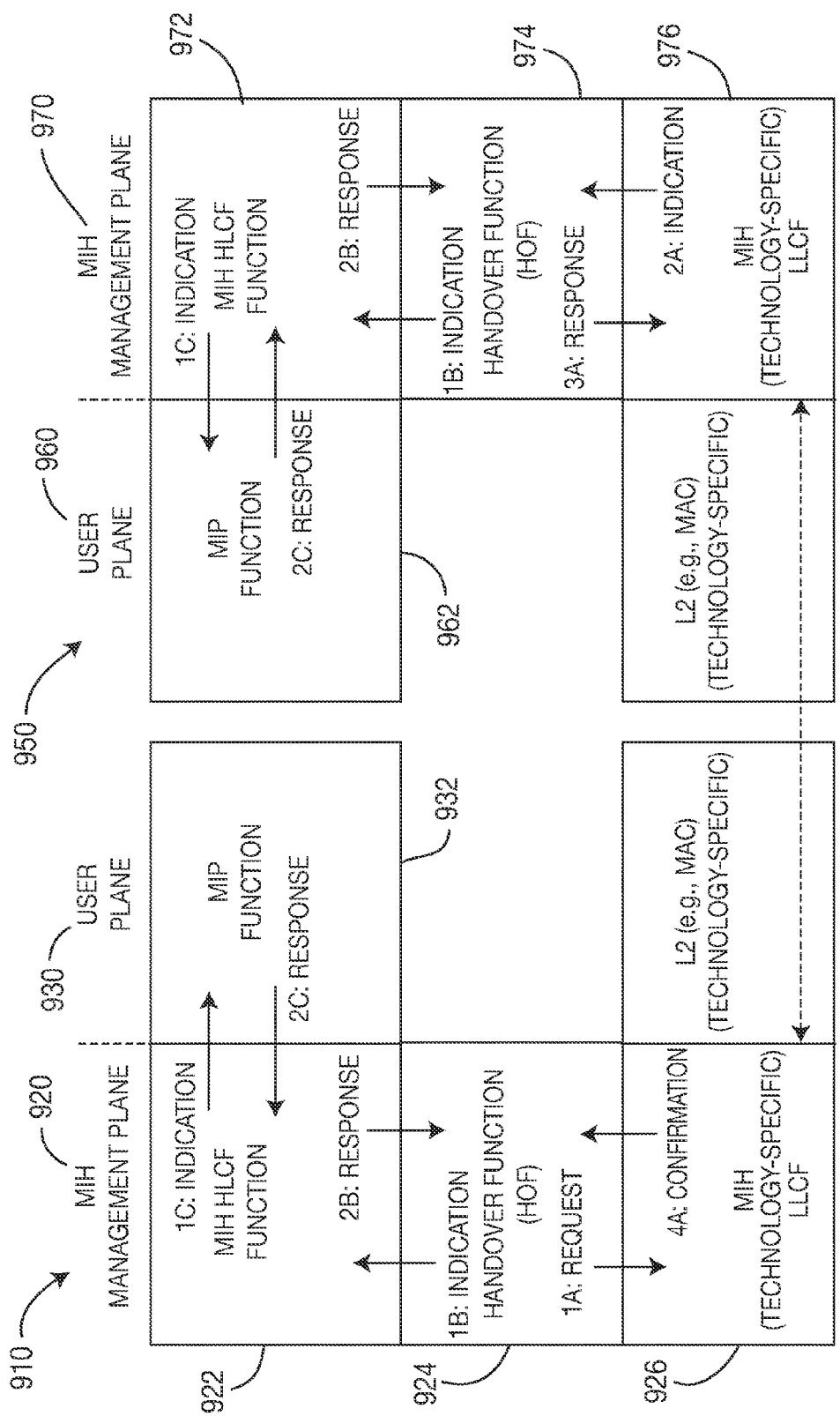
FIG. 9 illustrates the use of three groups of exemplary triggers.

Triggers are used to provide internal, external and peer communication. These triggers do not appear as such on the medium, (e.g., the access interface), but serve to define more clearly the relationships between the different layers and planes. FIG. 9 illustrates the use of three groups of exemplary triggers. They are identified as A, B, and C. The number illustrates the sequence of the triggers within the same group.

Group A illustrates a peer-to-peer communication between a first peer 910 and a second peer 950. Both the first peer 910 and the second peer 950 comprise a MIH management plane 920, 970 and a user plane 930, 960, respectively. An initial request for service from an MIH handover function 924 to an MIH LLCF 926 is provided by the "request" trigger (1A). This request is sent to the second peer MIH LLCF 976 as shown in a dotted line. The MIH LLCF 976 in the second peer generates an "indication" trigger (2A) to inform the MIH handover function 974 of the request. The MIH handover function 974 responds with a "response" trigger (3A) to the MIH LLCF 976. The response is sent across the link to the LLCF 926 on the first peer, and the LLCF 926 sends a "confirmation" trigger (4A) to the MIH handover function 924.

When the information is transported from the higher level entity to the lower level entity within the same management plane and within the same node, a pair of "request" and "confirmation" is used as shown by 1A and 4A.

Group B illustrates the scenario when the information is transported from the lower level entity to the higher level entity within the same management plane and within the same node. A pair of "indication" and "response" is used as shown by 1B and 2B.

Group C illustrates the scenario when the information is exchanged between the MIH HLCF 922, 972 and higher layer application, such as Mobile IP function 932, 962. A pair of "indication" and "response" is used as shown by 1C and 2C.

In accordance with the present invention, several remote transport options are supported. MIH may send generic messages that are passed as primitives to a MAC layer, so that dedicated management messages can be used to exchange the information and be delivered as SAP primitives at the other side MIH function. MIH may generate and exchange messages through MIP vendor-specific extensions. Ethernet type frames may be used, similar to 802.1X, to exchange information between management planes. A hybrid approach may be used, on which different convergence layers implement different transport mechanisms.

Internal triggers are those triggers within MIH functions. External triggers are those between an MIH management plane and a user plane. Tables 1 and 2 are summary of external triggers and internal triggers. The MIH_PHY.set, MIH_PHY.get and MIH_PHY.reset triggers correspond to an MIH_PHYCONFIG trigger. The MIH_MAC.set, MIH_MAC.get and MIH_MAC.reset triggers correspond to an MIH_PHYCONFIG trigger. These triggers configure the information that should be broadcast over the air to aid the WTRU in the discovery and selection of a suitable network. Furthermore, these triggers set a threshold within both the PHY and MAC layers that are used to determine when an event should be triggered.

TABLE 1

| Triggers | Source | Destination | Local/Remote | Description |
|---|---|---|---|---|
| MIH_PHY.set (MIH_PHYCONFIG) | MIH | PHY | both | MIH configures PHY for information services |
| MIH_PHY.get (MIH_PHYCONFIG) | MIH | PHY | both | MIH enquires configuration info |
| MIH_PHY.reset (MIH_PHYCONFIG) | MIH | PHY | both | MIH resets PHY configuration |
| MIH_MAC.set (MIH_MACCONFIG) | MIH | MAC | both | MIH configures MAC for information services |
| MIH_MAC.get (MIH_MACCONFIG) | MIH | MAC | both | MIH enquires configuration info |
| MIH_MAC.reset (MIH_MACCONFIG) | MIH | MAC | both | MIH resets MAC configuration |
| MIH_MACINFO.indication | MAC | MIH | local | MAC sends system information |
| MIH_MACINFO.response | MIH | MAC | local | Response for the above indication. |
| MIH_INFO.indication | MIH MIH | L2, L3 handover | local | MIH entities indicate the existence of MIH functions |
| MIH_INFO.response | L2, L3 handover | MIH | local | Response for the above indication. |
| MIH_PHYEVENT.indication | PHY | MIH | both | PHY measurement reports |
| MIH_PHYEVENT.response | MIH | PHY | both | Response for the above indication. |
| MIH_MACEVENT.indication | MAC | MIH | both | MAC measurement reports |
| MIH_MACEVENT.response | MIH | MAC | both | Response for the above indication. |
| MIH_MACORDER.request | MIH | MAC | local | MIH request HO related MAC actions |
| MIH_MACORDER.confirmation | MAC | MIH | local | MAC informs MIH if the action is accomplished |
| MIH_HANDOVER_COMPLETE | MAC | MIH | local | MAC informs MIH that the data path is successfully switched over a new access link (e.g., radio connection). |
| MIH_HANDOVER_PREPARE.indication | MIH MIH | MIP MAC | local | MIH and inform external entities to prepare for handover |
| MIH_HANDOVER_PREPARE.response | MIP MAC | MIH MIH | local | Response for the above indication. |
| MIH_HANDOVER_COMMIT.indication | MIH MIH | MIP MAC | local | MIH informs external entities to execute for handover |
| MIH_HANDOVER_COMMIT.response | MIP MAC | MIH MIH | local | Response for the above indication. |

TABLE 2

| Triggers | Source | Destination | Local/Remote | Description |
|---|---|---|---|---|
| MIH_SYSINFO.indication | MIH LLCF | HOF | local | MIH LLCF informs HOF of any system information update |

TABLE 2-continued

| Triggers | Source | Destination | Local/Remote | Description |
|---|---|---|---|---|
| MIH_SYSINFO.response | HOF | MIH LLCF | local | Response for the above indication. |
| MIH_MOBILITY.request | HOF | MIH LLCF | both | HOF sends handover decision to MIH LLCF |
| MIH_MOBILITY.indication | HOF | MIH HLCF | both | HOF informs MIH HLCF and peer HOF of handover decision |
| MIH_MOBILITY.response | MIH HLCF | HOF | both | Response of the above indication |
| MIH_MOBILITY.confirmation | MIH LLCF | HOF | both | Confirmation of the HOF mobility request |
| MIH_REPORT.indication | MIH LLCF | HOF | local | MIH LLCF sends MIH triggers to HOF |
| MIH_REPORT.response | HOF | MIH LLCF | local | Response of the above indication |
| MIH_MACRELEASE.request | HOF | MIH LLCF | local | When handover procedures finished, HOF informs MIH LLCF |
| MIH_MACRELEASE.confirmation | MIH LLCF | HOF | local | Confirmation of the above request |

Figure 10A:
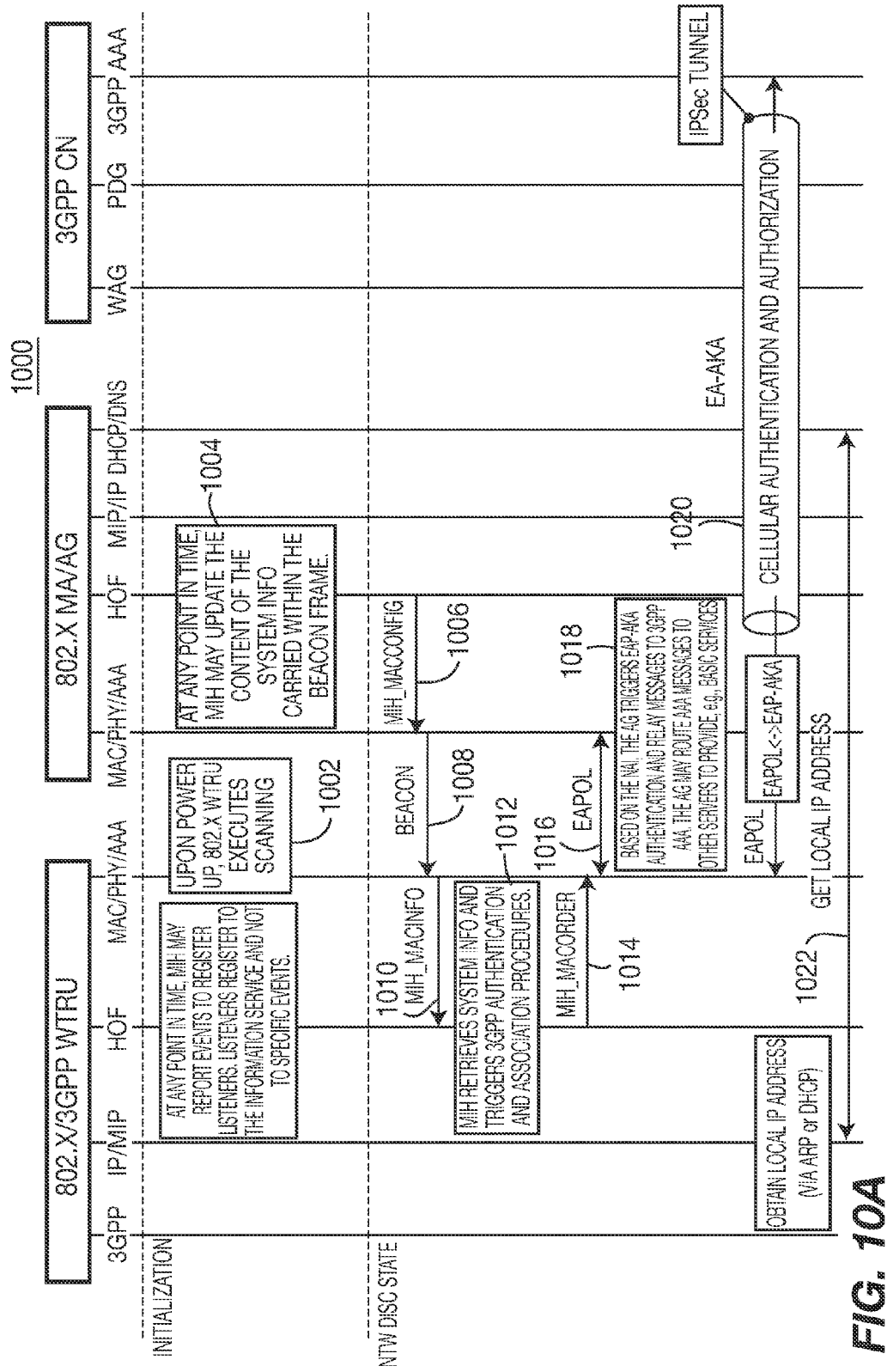
FIGS. 10A and 10B, taken together, show a process for system access, IEEE 802.X and WLAN/3GPP inter-working in accordance with the present invention.
Figure 10B:
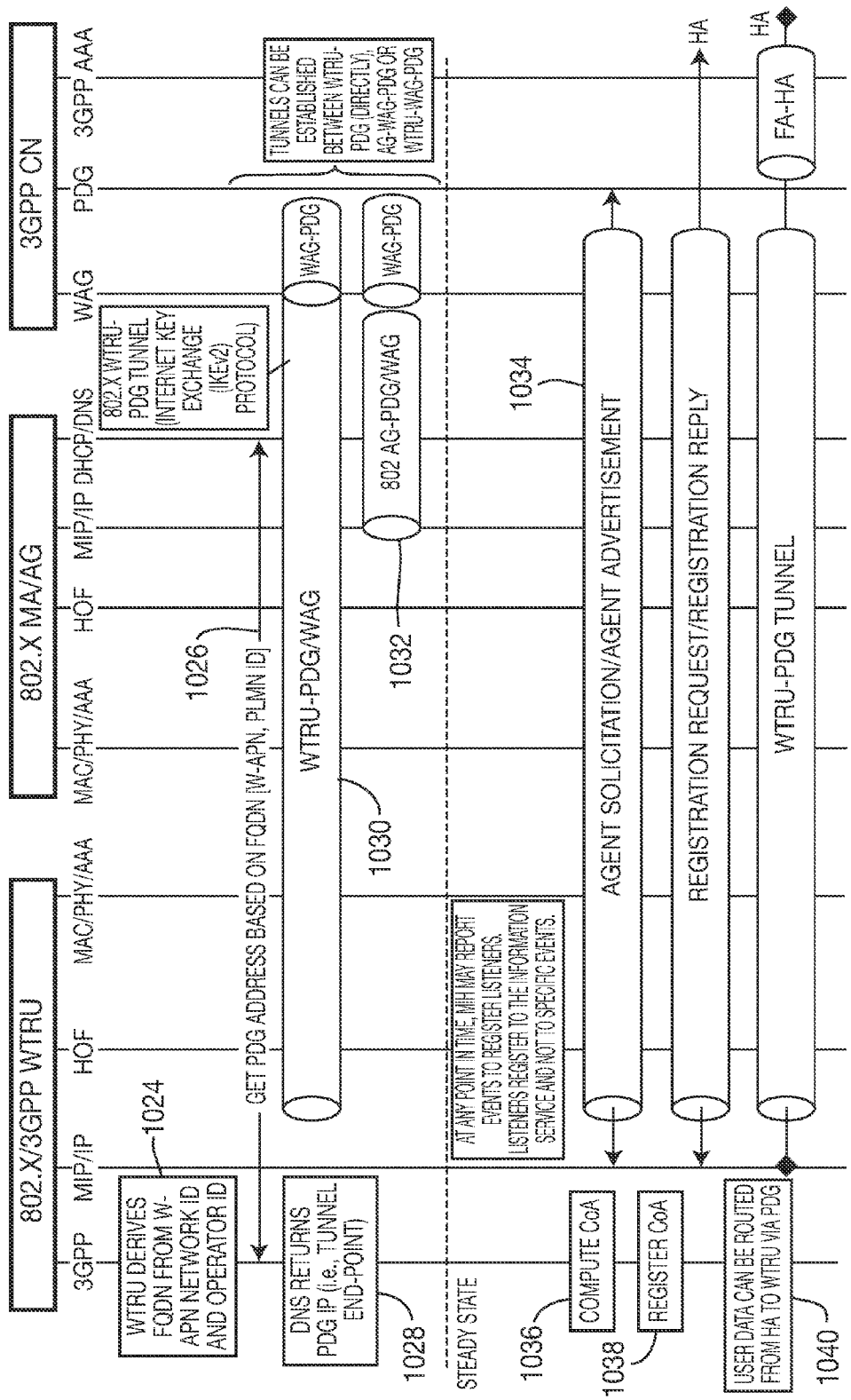

FIGS. 10A and 10B, taken together, show a process 1000 for system access, IEEE 802.X and WLAN/3GPP inter-working in accordance with the present invention. The WTRU 110 is powered on and the HOF 324 is initialized. The WTRU 110 performs scanning (active or passive) to find a suitable WLAN/3GPP network (step 1002). The WLAN periodically transmits beacon frames for this purpose. The MIH function of the WLAN may order changes of the content of the beacon frame at any time (step 1004), which is passed by an MIH_MACCONFIG message (step 1006). This may happen either as a manual request from the management system or dynamically based on radio environment measurements or the like.

If a WLAN network is found, the WTRU 110 reads beacon information transmitted by the network (step 1008). Alternatively, the WTRU 110 may attempt to fetch system information either through probe request and probe response messages or by accessing a known data base within the candidate system at a later stage.

When the beacon frames are detected, the WTRU 110 first identifies whether MIH information is supported, (e.g., through a specific 802.21 flag broadcast on the beacon frame). If so, the WTRU 110 reads its content. Any MIH information found within a beacon frame, (e.g., system operator identity, PGSs (W-APN), neighboring maps and SMS, IMS, VoIP and other system capabilities), is passed to the HOF 324 through an MIH_MACINFO message (step 1010). MIH specific information is set or updated either manually or dynamically by the AN HOF 324.

The HOF 324 retrieves system information, selects a candidate 3GPP network based on this information and triggers 3GPP authentication and association procedures toward the selected network (step 1012). The MIH orders the authentication and association through a MIH_MACORDER message (step 1014). Between the WTRU 110 and the AG 114, an extensible authentication protocol over local area network (LAN), (EAPOL), procedure is initiated (step 1016). As a part of this procedure, the WTRU 110 provides the relevant network access identification (NAI). The AG 114 uses the NAI to route an authentication procedure to the relevant AAA server. The AG 114 triggers EAP-authentication key agreement (AKA) authentication and relay messages to a 3GPP AAA server 132 (step 1018). The AG 114 may route AAA messages to other servers to provide basic services.

Successful routing of EAP-AKA messages results in an establishment of an Internet protocol security (IPsec) tunnel that carries EAP-AKA messages (step 1020). In addition, the AG 114 may use the NAI to determine whether the user requires basic or premium service. Furthermore, the NAI may be used to route messages to specific ports that may only provide services such as network capabilities available for this particular user.

Upon successful authentication and authorization the WTRU 110 obtains a local IP address from the local dynamic host configuration protocol (DHCP) server or using address resolution protocol (ARP) (step 1022). Using the selected PDG (-APN) the WTRU 110 derives a fully qualified domain name (FQDN) (step 1024). The WTRU 110 uses the FQDN to determine the IP address of the relevant PDG using the local domain name server (DNS) (steps 1026 and 1028). Once the PDG IP address is obtained, an WTRU-PDG tunnel can be established (step 1030 or 1032).

The WTRU-PDG tunnel may be established in four different ways: 1) the WTRU 110 establishes a tunnel directly to the PDG; 2) the WTRU 110 establishes a tunnel to the WAG 134 and a tunnel from the WAG 134 to the PDG 136 is further established; 3) the AG 114 establishes a tunnel to the WAG 134 and then a tunnel from the WAG 134 to the PDG 136 is further established; 4) the AG 114 establishes a tunnel directly to the PDG 136.

Once the tunnel is established, the WTRU 110 either receives agent advertisement messages from the PDG (acting as a foreign agent) or requests it using an agent solicitation message in accordance to RFC2002 (step 1034). The WTRU 110 uses the PGA router address to construct its care of address (CoA) (step 1036). The WTRU 110 registers its CoA with its home agent (HA) 142 (step 1038). Data destined for the WTRU 110 is now routed via the HA 142 through a new tunnel established between the HA 142 and the FA 136 based on the supplied CoA (step 1040).

Figure 11A:
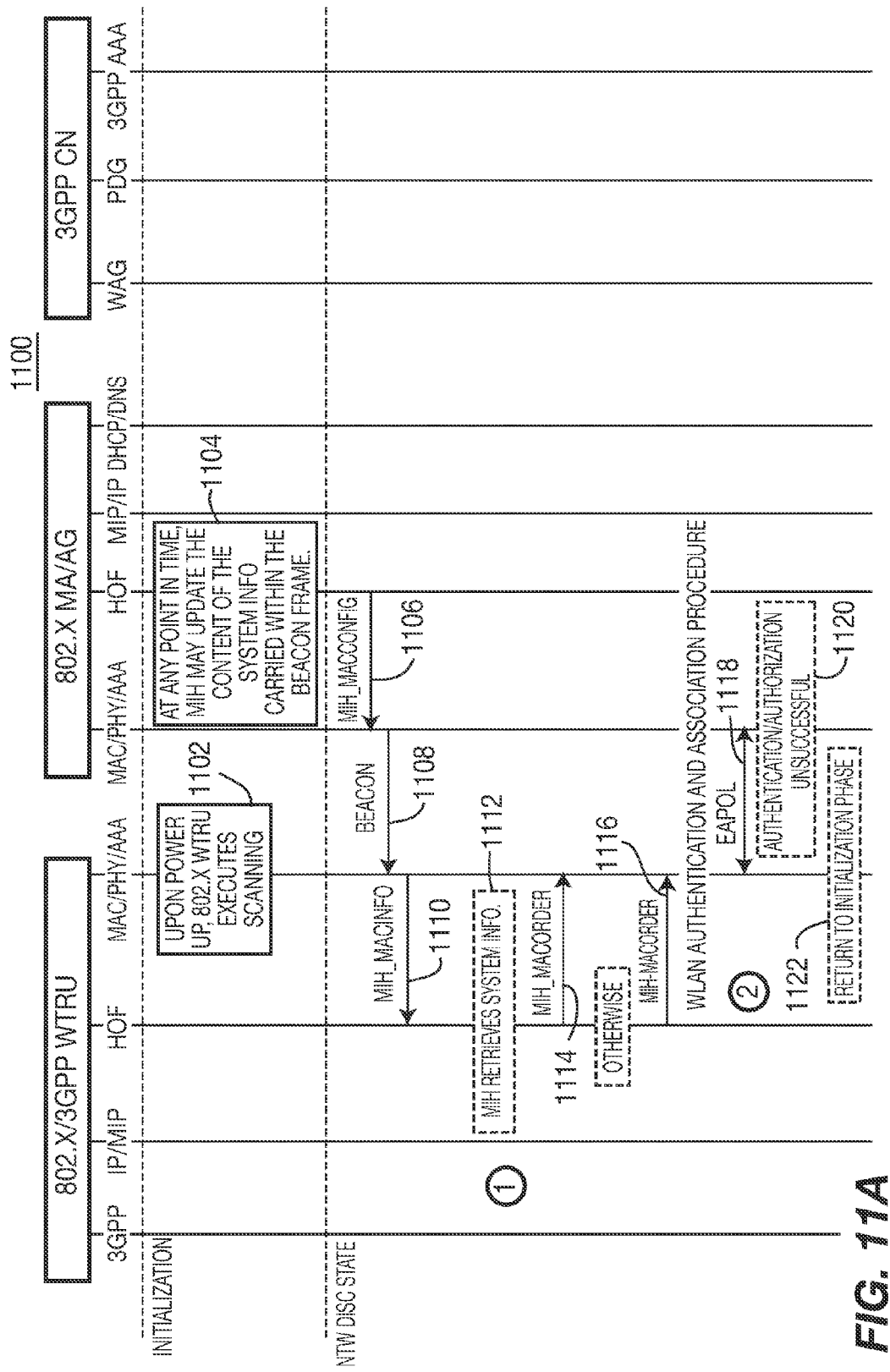
FIGS. 11A-11C, taken together, show a process for system access, an 802.X and 3GPP inter-working failure case in accordance with the present invention.
Figure 11B:
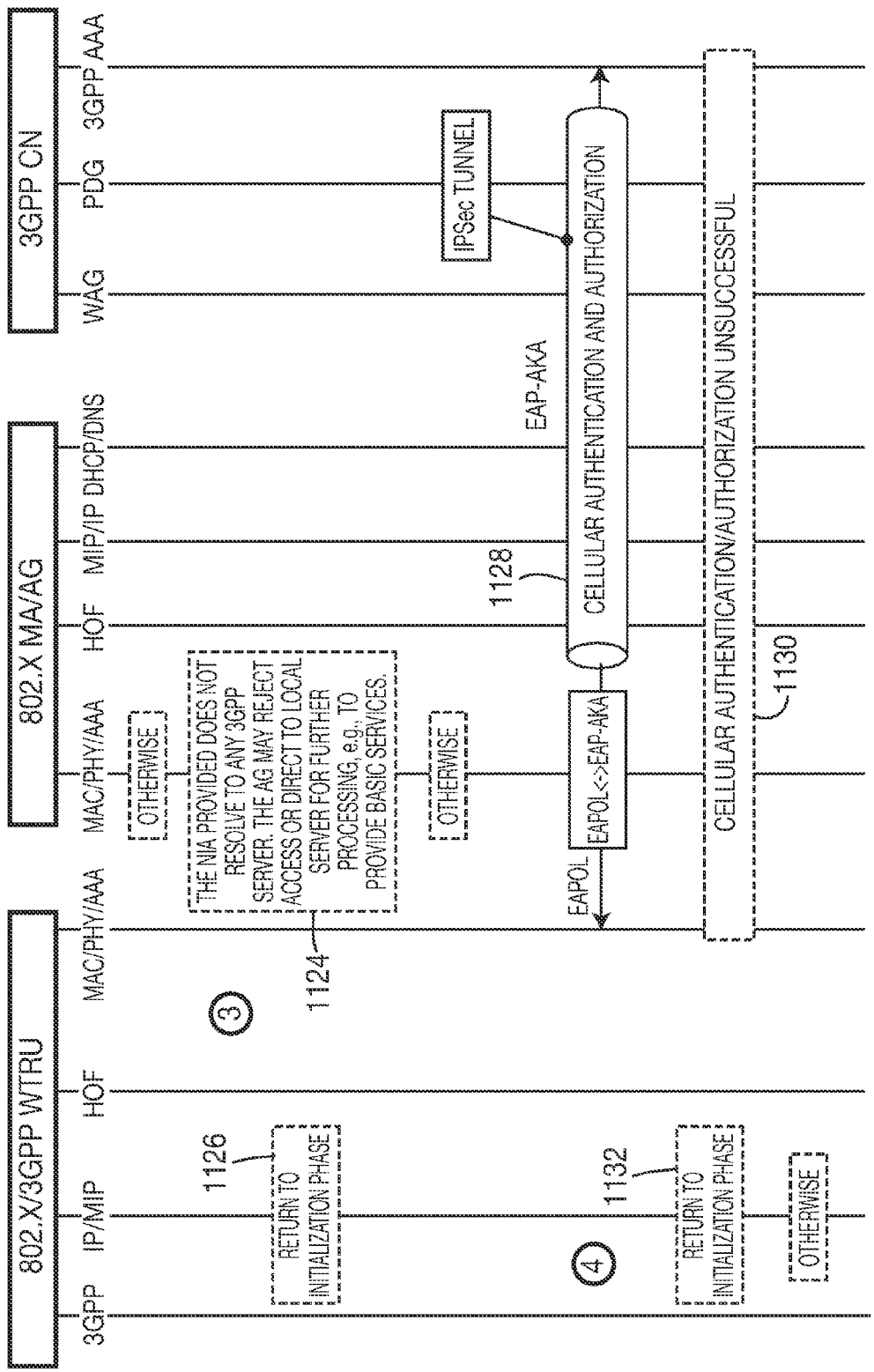
Figure 11C:
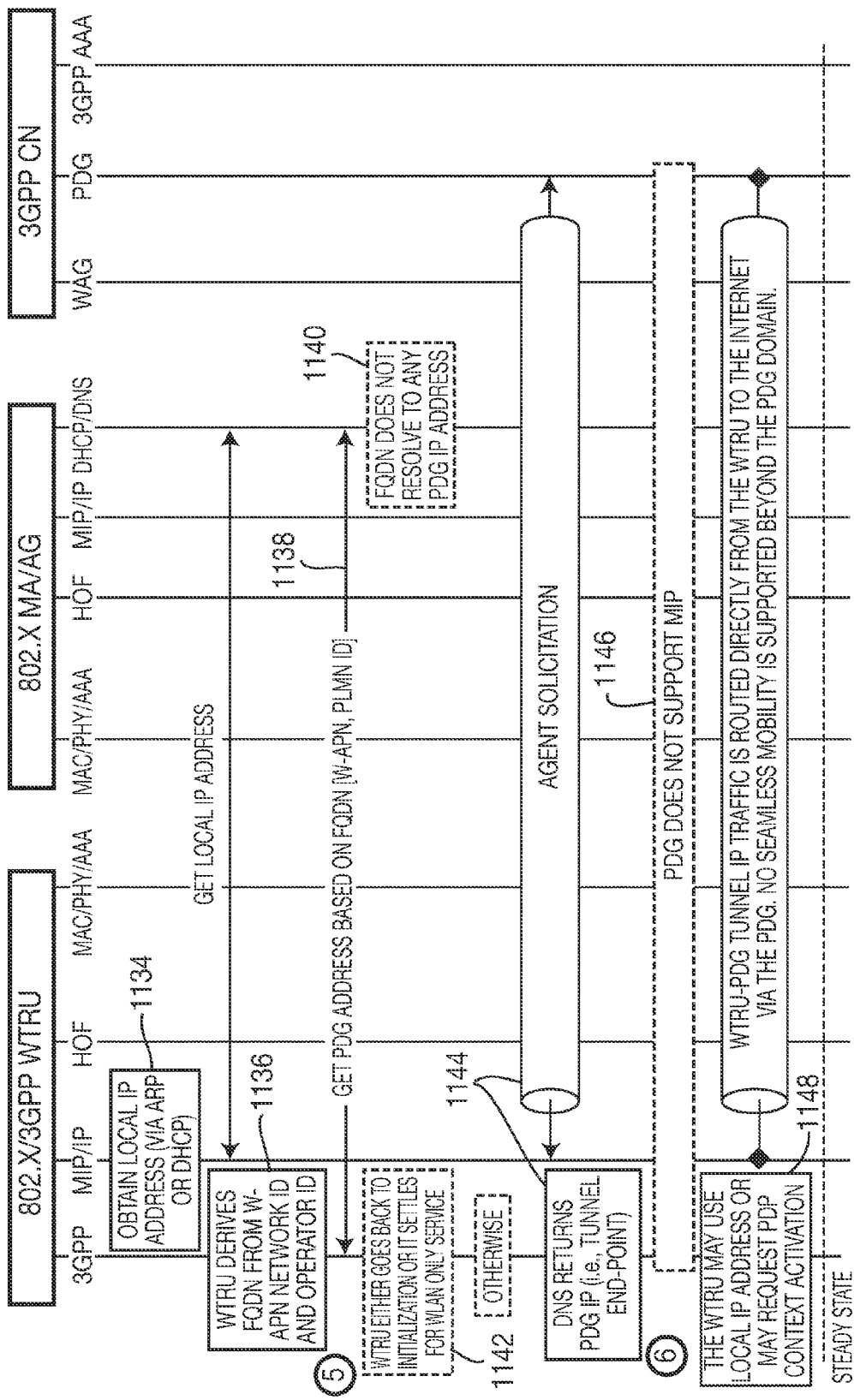

FIGS. 11A-11C, taken together, show a process 1100 for system access, and 802.X and 3GPP inter-working failure case in accordance with the present invention. The WTRU is powered on and the MIH handover function is initialized. The WTRU performs scanning (active or passive) to find a suitable WLAN/3GPP network (step 1102). The WLAN periodically transmits beacon frames for this purpose. The HOF 324 of the WLAN may order changes of the content of the beacon frame at any time (step 1104), which is passed by an MIH_MACCONFIG message (step 1106). If a WLAN network is found, the WTRU reads beacon information (step 1108). The WTRU reads beacon information and it is passed to the HOF 324 through an MIH_MACINFO message (step 1110).

The MIH function determines whether one or more values provided within the system information parameters satisfies the necessary condition for system access (step 1112). For example, the MIH function determines whether the system operator is bared, the quality of service (QoS) is adequate or there is a better candidate identified within a potential neighboring set provided in the message.

If the MIH function determines that the parameters provided by the information service do not satisfy internal configured requirements, then the MIH function orders the MAC layer to return to the scanning phase using a MAC_ORDER message (step 1114).

If the requirements are satisfied, the MIH function triggers EAPOL authentication using a MIH_MACODER message (step 1116) and EAPOL procedure is initiated (step 1118). The AG 114 may determine the level of service that the user requires, (e.g., 3GPP IMS), based on the NAI that triggered the authentication procedure or the authentication procedure itself.

The WTRU authentication is performed according to the EAPOL procedures (step 1120). If authentication fails, the system access is denied and the WTRU returns to the initialization state (step 1122). If the NAI provided does not resolve to any 3GPP server, the AG 114 may reject access or direct to local server for further processing (step 1124). For example, the AG 114 may determine that the user is still allowed to receive basic services, even though the authentication procedure failed for premium services. If the AG 114 is not able to route the authentication request, it may respond by indicating the available AAA servers where the request can be routed. If the WTRU determines that there are no suitable AAA servers, the WTRU may decide to return to the initialization state (step 1126).

If a successful routing of AAA messages is achieved, an IPSec tunnel is established between the AG 114 and to the 3GPP AAA server 132 and the AG 114 relays an EAP message to the AAA server 132 (step 1128). The AG 114 acts as an authenticator between the WTRU and the AAA server. The AG 114 relays authentication messages between the WTRU and the relevant AAA server.

If the WTRU fails the cellular authentication procedure (step 1130), access to special services, such as 3GPP services, may be denied and the WTRU returns to the initialization state (step 1132). Alternatively, the AG 114 may still grant access to basic services, (e.g., Internet service), or access to a portal that may provide the user with further information.

If the cellular AAA server successfully authenticates the WTRU, the WTRU proceeds to obtain a local IP address from the local DHCP (step 1134). Using the W-APN, the WTRU constructs an FQDN (step 1136) and attempts to obtain PDG IP address based on the FQDN (step 1138). If the DNS server cannot resolve the FQDN to any IP address, the WTRU cannot access a PDG within the existing WLAN network (step 1140). The WTRU may choose to return the initialization state or to settle for WLAN only services (step 1142). The AG 114 may choose to provide a "default" PDG address. In this case the WTRU shall provide this information to the end user who may decide to connect to the default PDG. This procedure can be automatic based on configuration parameters within the AG 114 and the WTRU 110.

If the DNS returns a valid PDG address, the WTRU 110 establishes a tunnel towards the PDG 136, (e.g., a L2TP tunnel), and listens for agent advertisement messages from the PDG 136 (step 1144). If no agent advertisement messages are received the WTRU 110 sends an agent solicitation.

If no response is received (step 1146), (e.g., MIP is not supported), delivery of a packet from other PDN is still possible through the PDG 136. The WTRU 110 may use the local IP address or may request PDP context activation (step 1148). In this case, WTRU-PDG tunnel IP traffic is routed directly from the WTRU 110 to the Internet 120 via the PDG 136 and no seamless mobility is supported beyond the PDG 136.

Figure 12A:
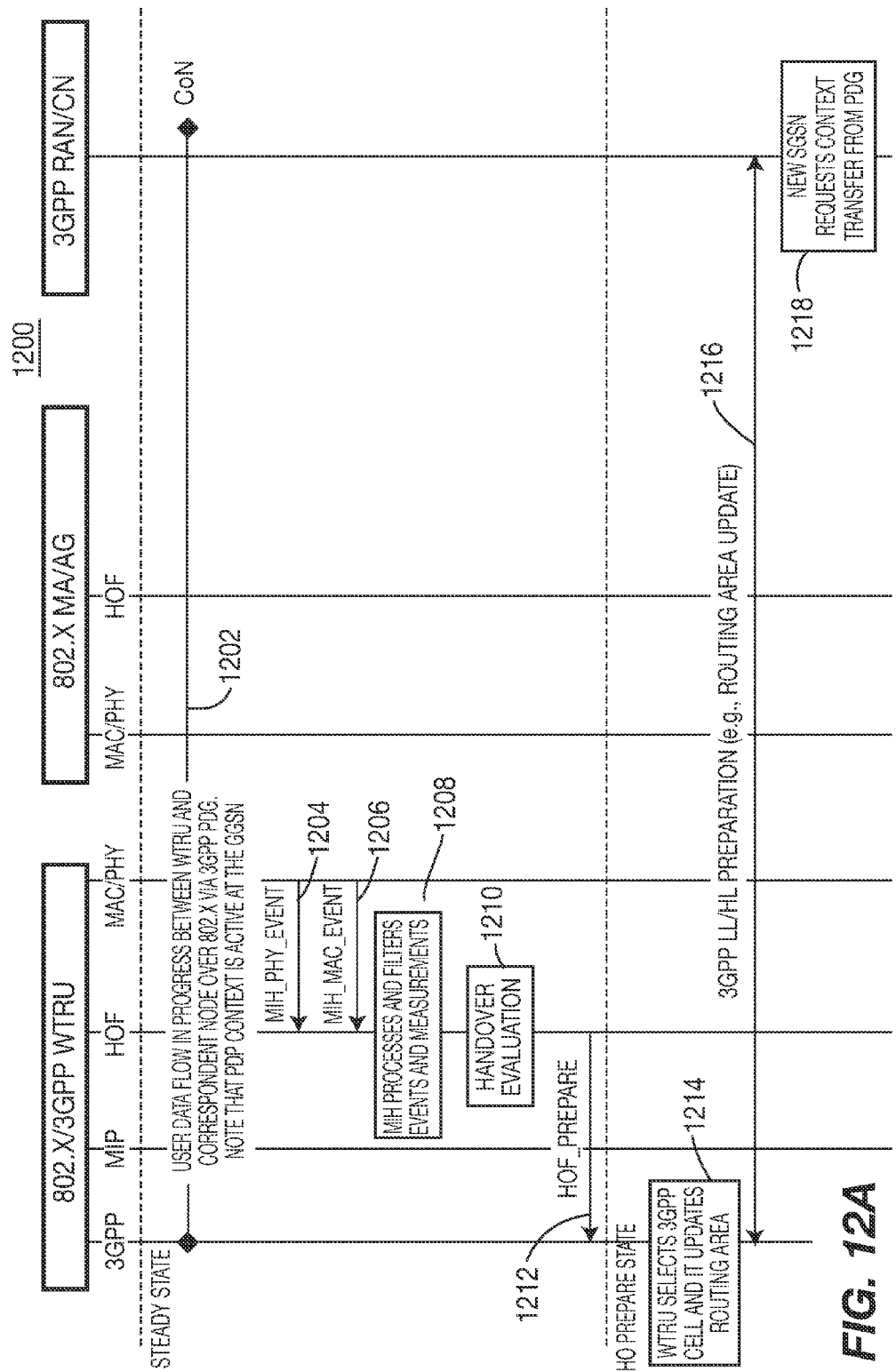
FIGS. 12A and 12B, taken together, show a process for a WTRU initiated and WTRU controlled handover from 802.X to 3GPP in accordance with the present invention.
Figure 12B:
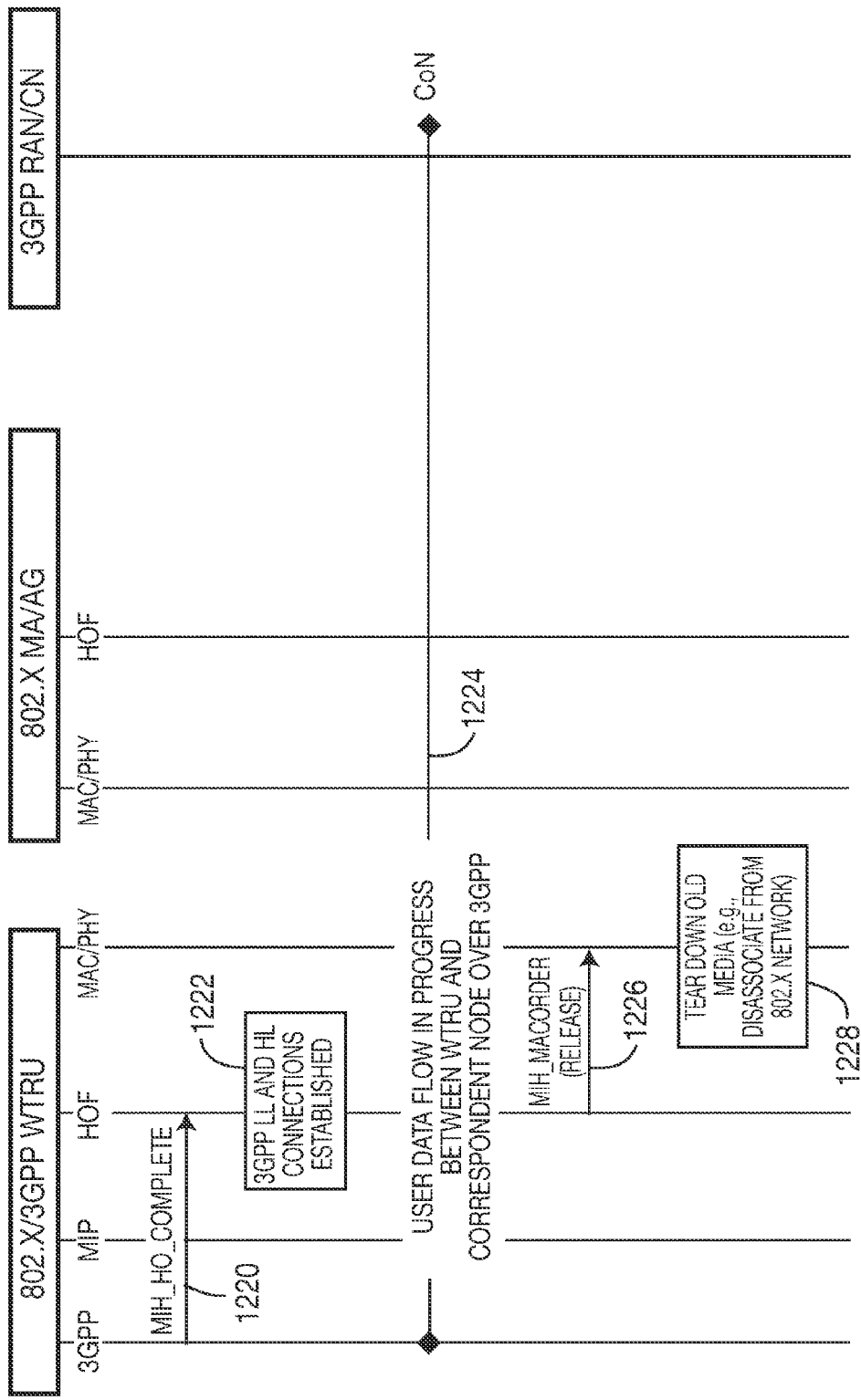

FIGS. 12A and 12B, taken together, show a process 1200 for a WTRU initiated and a WTRU controlled handover from 802.X to 3GPP in accordance with the present invention.

Referring to FIG. 12A, user data flow is established between the WTRU and the CoN 140 over an 802.X via 3GPP PDG 136 (step 1202). The PDP context is active at the GGSN. The MIH handover function receives measurements while the MIH management entity is in a steady state. If the physical layer detects that predetermined performance thresholds have been crossed, the physical layer sends an event indication, MIH_PHY_EVENT, to the MIH handover function (step 1204). If the MAC layer detects that performance thresholds have been crossed, the MAC layer sends an event indication, MIH_MAC_EVENT, to the MIH handover function (step 1206).

The MIH processes and filters MAC and PHY layers measurements (step 1208) and performs handover evaluation (step 1210). A combination of events, such as signal quality and specific network characteristics, (e.g., preferred PLMN), can be used to determine whether the handover process shall be triggered. If the MIH handover function determines that a condition (or a combination of them) has been met and therefore a handover attempt shall be triggered, the MIH informs the 3GPP layer, (through HOF_PREPARE), that a handover is imminent on the IEEE 802.X side (step 1212).

Based on this trigger, the WTRU initiates cell selection and performs a routing area update (step 1214). The routing area update is a process executed by the WTRU to inform the network whenever it moves from one area to the other. The WTRU is responsible for tracking routing area codes. When a routing area code is different from its last update, the WTRU performs another update by sending it to the network. At this point both radio connection and connections towards new SGSN are established (step 1216).

The new SGSN requests packet data protocol (PDP) context transfer from the PDG (step 1218). The PDP context is a data present on both the SGSN 138 and the GGSN 136 which contains the subscriber's session information when the subscriber has an active session, including subscriber's IP address, subscriber's IMSI, tunnel ID at the GGSN 136 and the SGSN 138, or the like.

Figure 13:
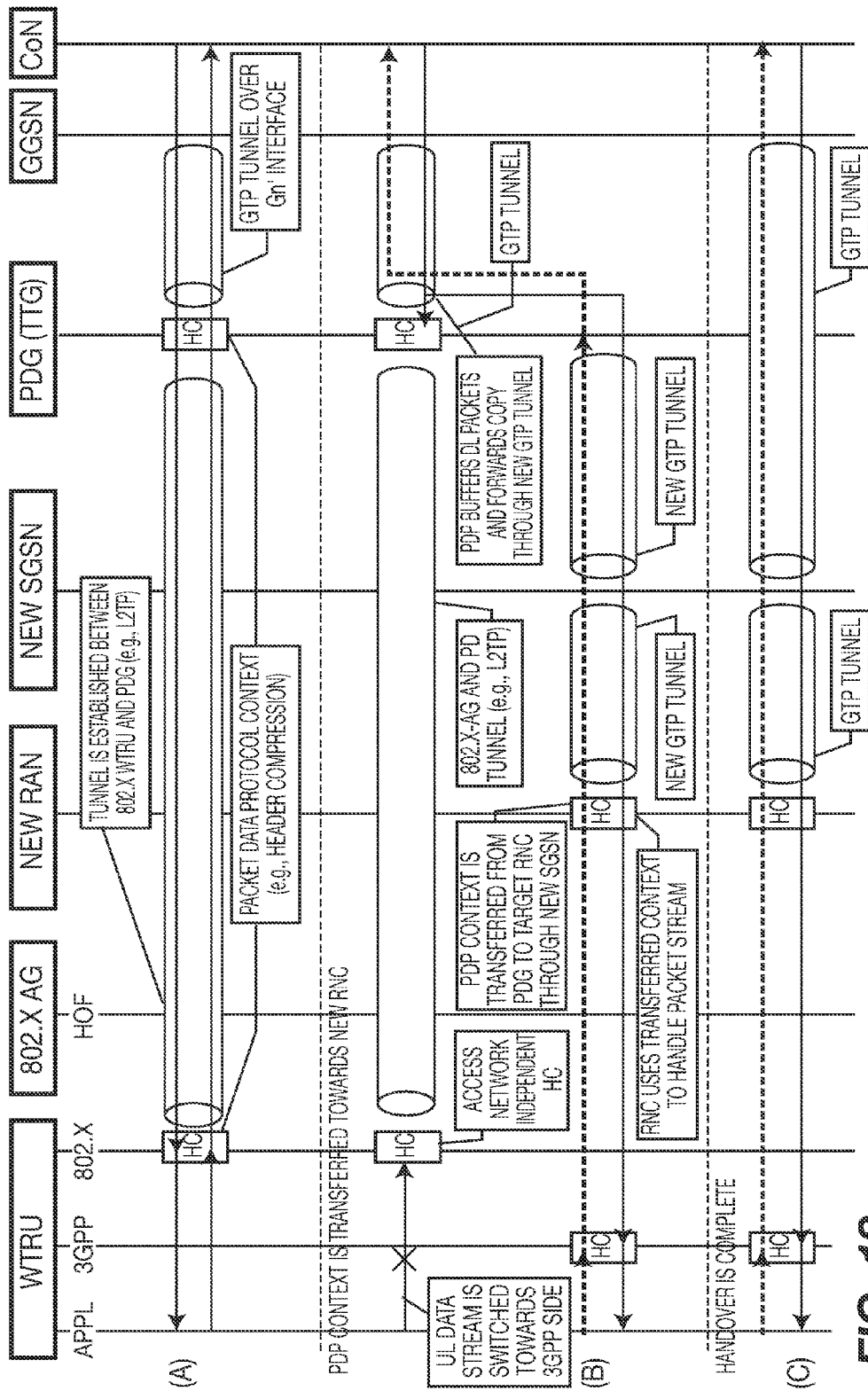
FIG. 13 shows establishment of a tunnel between a WTRU and a packet data gateway (PDG) in accordance with the present invention.

FIG. 13 shows a tunnel established between the WTRU and a PDG in accordance with the present invention. A "snap shot" of the current PDP context is taken at the PDG for both uplink and downlink flows. The PDG transfers this information to the new SGSN. Right after PDP context is transferred, the PDG stops sending downlink packets towards the WTRU. Packets received from a GGSN after this time are buffered. When the PDG is ready to start processing packets, the RNC establishes a new GTP tunnel and sends a duplicate of the packets that is buffered towards the PDG, via the old SGSN. This is done until a timer expires. The PDP is context is updated at the GGSN and a new GTP tunnel can be established (via Gn' interface). Packets are now received directly from the GGSN via the PDG Referring to FIG. 12B, upon successful PDP context transfer, the 3GPP layer informs MIH handover function that handover has successfully completed (step 1220). At such time 3GPP lower layer and higher layer connections are now established (step 1222) and user data flow is in progress between the WTRU 110 and the CoN 140 over a 3GPP network (step 1224). The HOF 324 orders release of the IEEE 802.X radio connection, (e.g., disassociation), (step 1226) and the old media is torn down (step 1228).

Figure 14A:
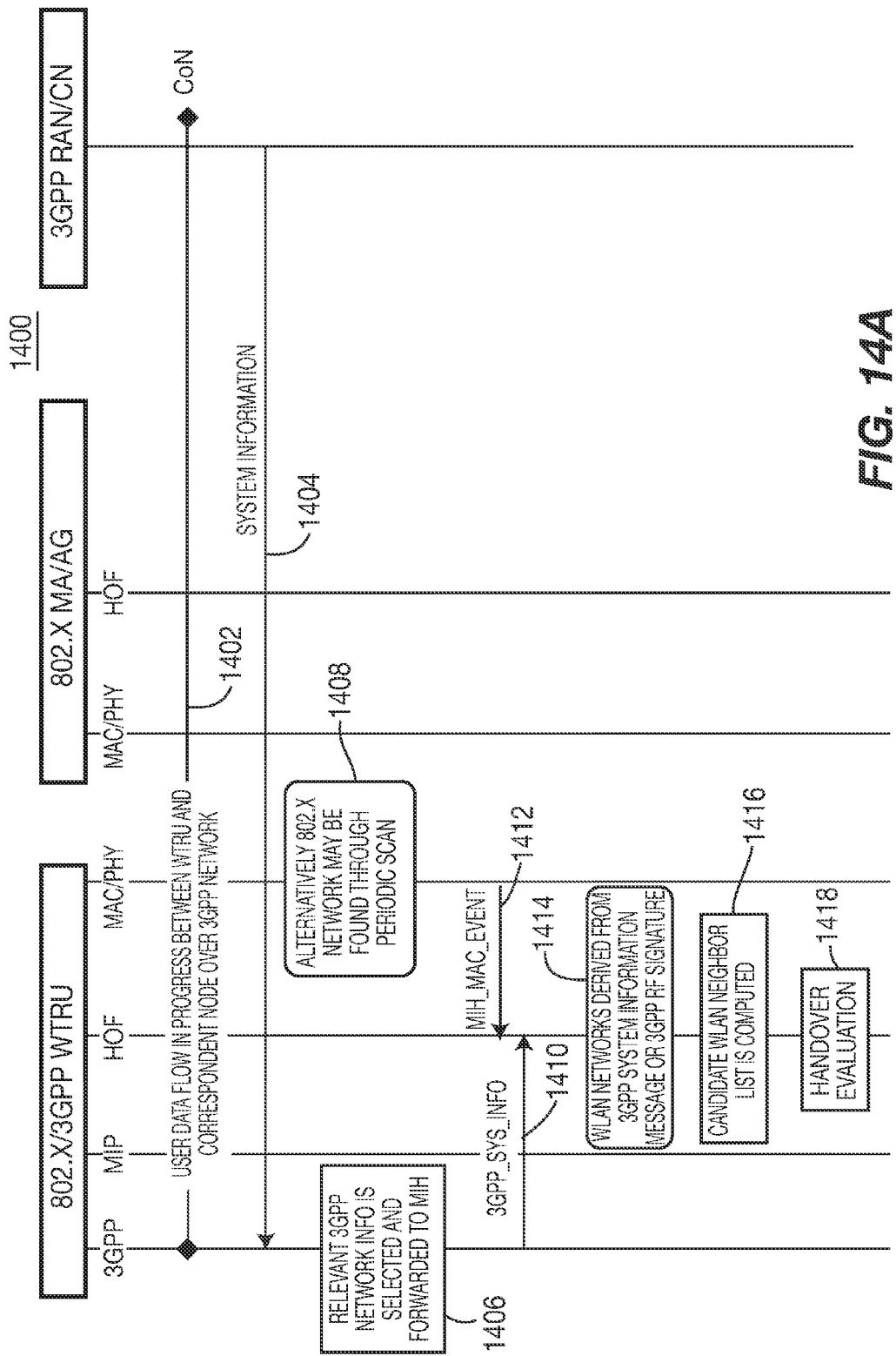
FIGS. 14A-14C, taken together, show a process for WTRU initiated handover from 3GPP to IEEE 802.11 in accordance with the present invention.
Figure 14B:
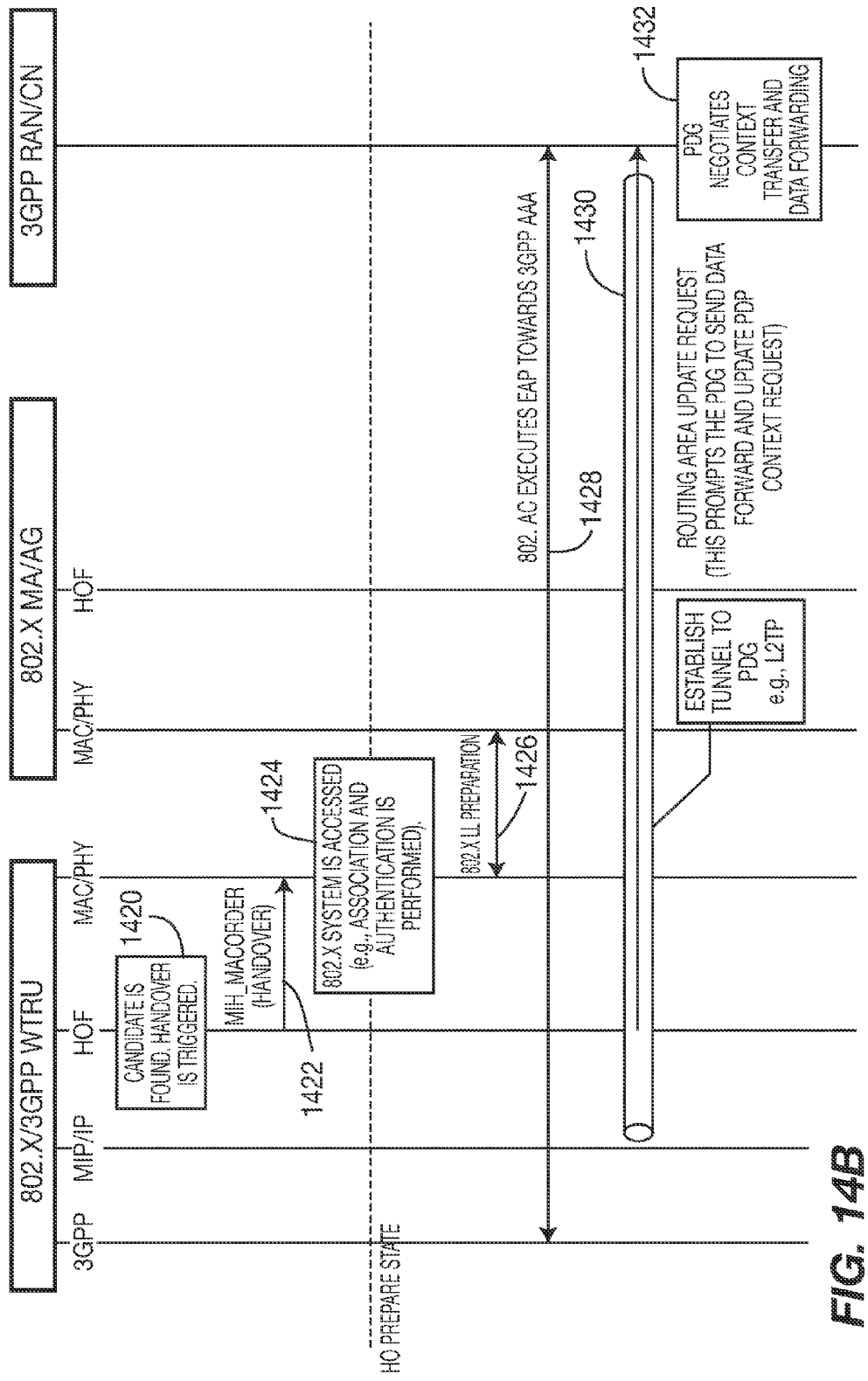
Figure 14C:
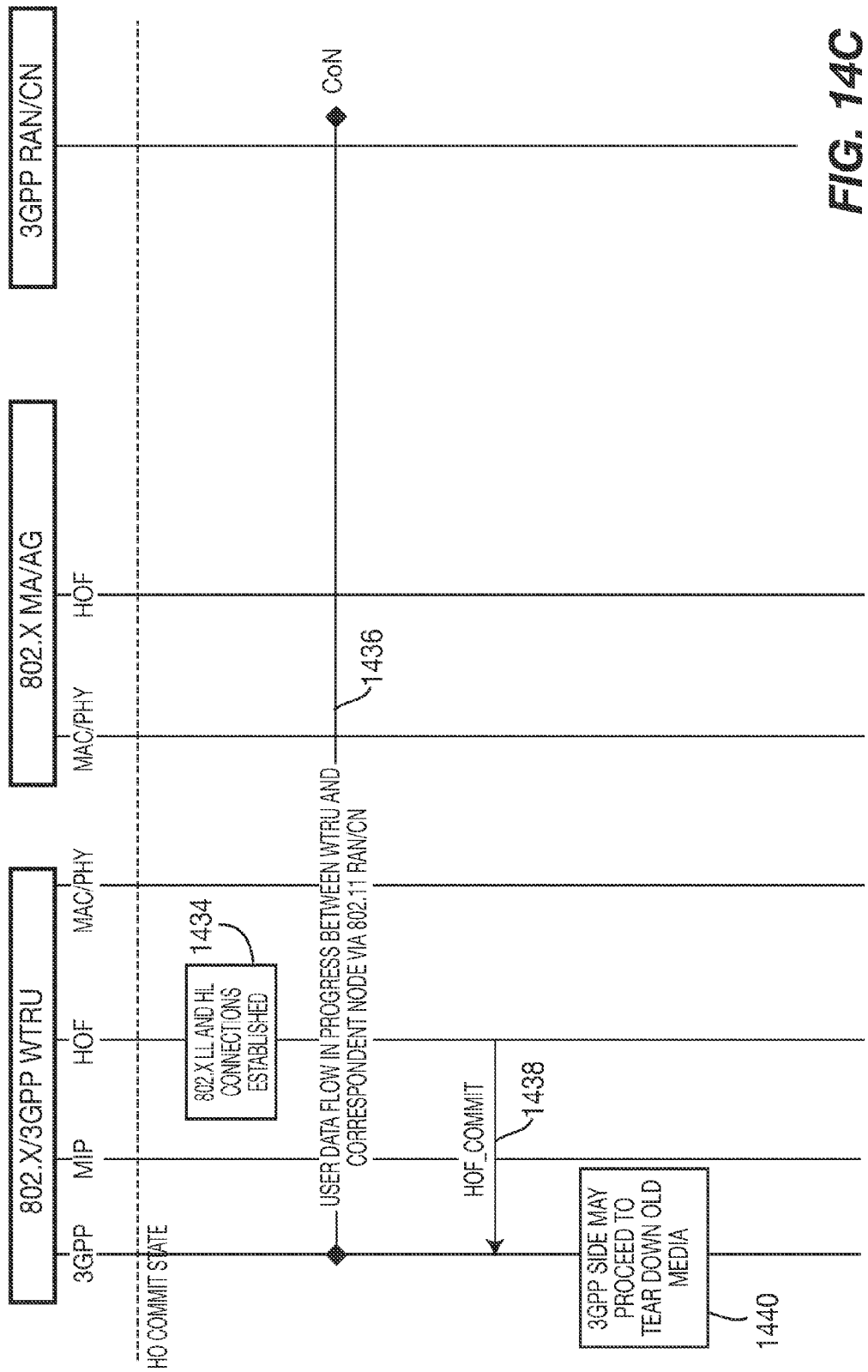

FIGS. 14A-14C, taken together, show a process 1400 for a WTRU initiated handover from 3GPP to IEEE 802.11 in accordance with the present invention. User data flow is established between the WTRU 110 and the CoN 140 over the 3GPP network (step 1402). System information is transmitted from the 3GPP network to the WTRU 110 (step 1404). The 3GPP layer extracts relevant system information that can be used to determine whether a handover to a WLAN system may be warranted and the 3GPP layer forwards this information to the MIH handover function (step 1406). Alternatively, the IEEE 802.X layer in the WTRU 110 may execute periodic scanning, either continuously or when prompted by system information received from the 3GPP component (step 1408).

Relevant 3GPP system information is forwarded to the MIH function (steps 1410, 1412). The MIH handover function determines whether there is a WLAN suitable for selection based on available information, (e.g., explicit indication, RF signature, geographical location, manual or automatic scanning, specific TMSI assignment, or the like) (step 1414). The MIH function then generates a list of potential candidates for handover (step 1416). The MIH function evaluates candidates for handover based on several aspects, such as system operator and known system capabilities (step 1418).

The MIH handover function finds a target for handover and triggers handover to 802.X system through MIH_MACORDER message (steps 1420, 1422). The WTRU 110 executes 802.X system association and authentication towards the target WLAN system (step 1424).

When the WTRU 110 is successfully associated and authenticated (step 1426), EAP is used towards relevant 3GPP AAA server 132 in accordance to RFC 2284 (step 1428). The WTRU 110 uses the WLAN identity and the associated PLMN to construct a FQDN and uses it to obtain the associated PDG address through DNS query. The WTRU 110 uses this address to establish an end-to-end tunnel toward the PDG 136, (e.g., using L2TP), (step 1430). Once the tunnel is established, the WTRU 110 executes a routing area update towards the PDG 136. The routing data update received at the PDG 136 triggers a context transfer request towards the old SGSN 138.

The PDG 136 establishes a new GPRS tunneling protocol (GTP) tunnel as shown in FIG. 13 and sends a duplicate of every packet that is buffered to the new SGSN. This is done until a timer expires or the new SGSN is ready to start processing packets. When the new network has successfully activated the PDP context, it is now ready to start processing packets. The PDP context is updated at the GGSN and a new GTP tunnel can be established. Packets are now received directly from the GGSN toward the new SGSN.

Figure 15:
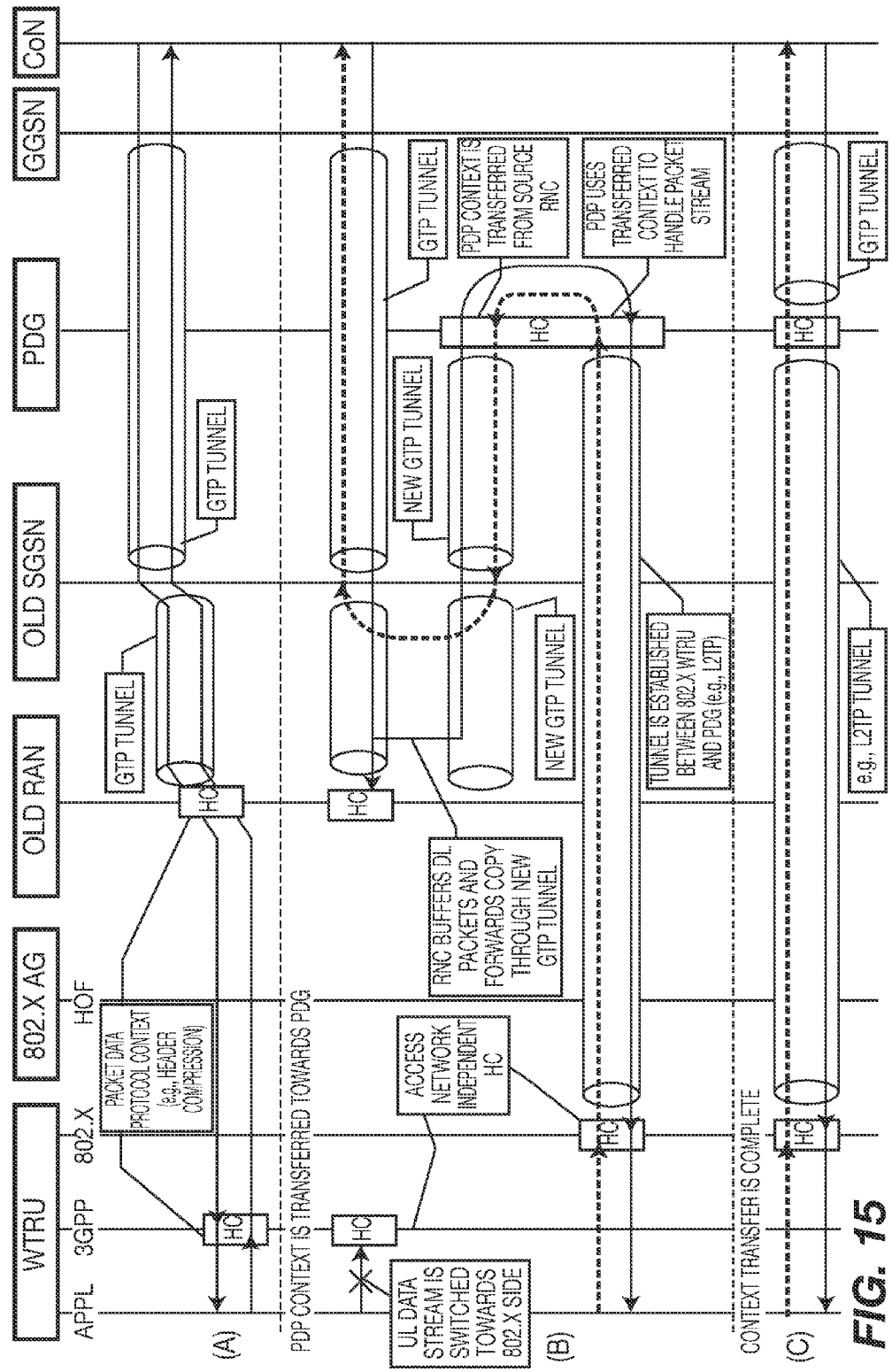
FIG. 15 shows the establishment of GPRS tunneling protocol (GTP) tunnels in accordance with the present invention.

FIG. 15 shows a GTP tunnel between an old RNC and an old SGSN and a GGSN. A "snap shot" of the current context is taken from the old RNC and it is transferred to the PDG via the old SGSN. Both uplink and downlink context information is captured. Right after PDP context is transferred, the RNC stops sending downlink packets towards the WTRU 110. Packets received from the GGSN 136 after this time are buffered.

Referring back to FIG. 14, after 802.X lower and higher layers are established (step 1434), user data flow from the WTRU 110 to the CoN 140 through the IEEE 802.X network is established (step 1436). The MIH informs that the handover has completed, though a HOF_COMMIT message (step 1438) and the 3GPP radio access bearer (RAB) may be released (step 1440).

Figure 16A:
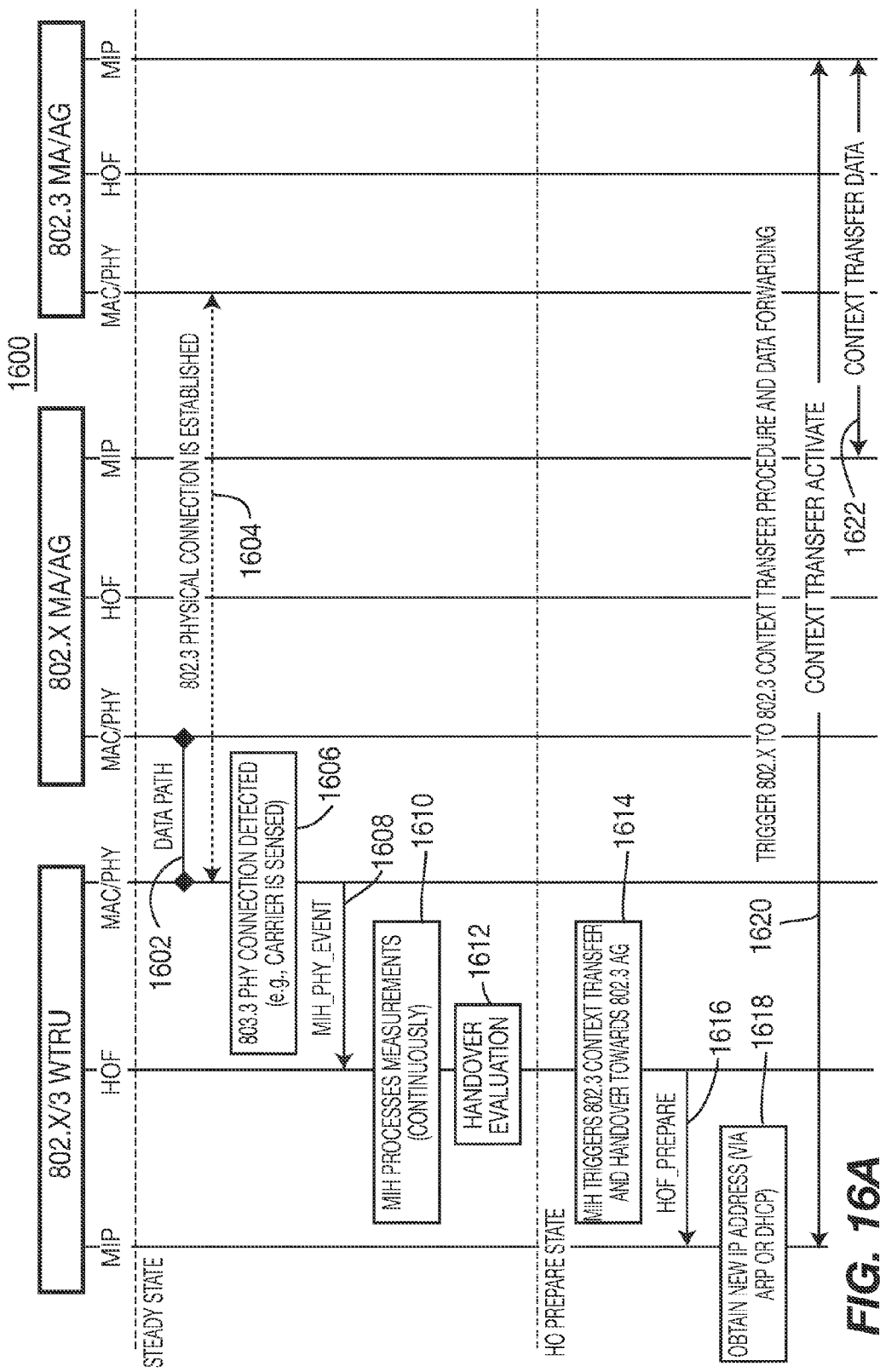
FIGS. 16A and 16B, taken together, show a process for WTRU initiated 802.X to 802.3 handover in accordance with the present invention.
Figure 16B:
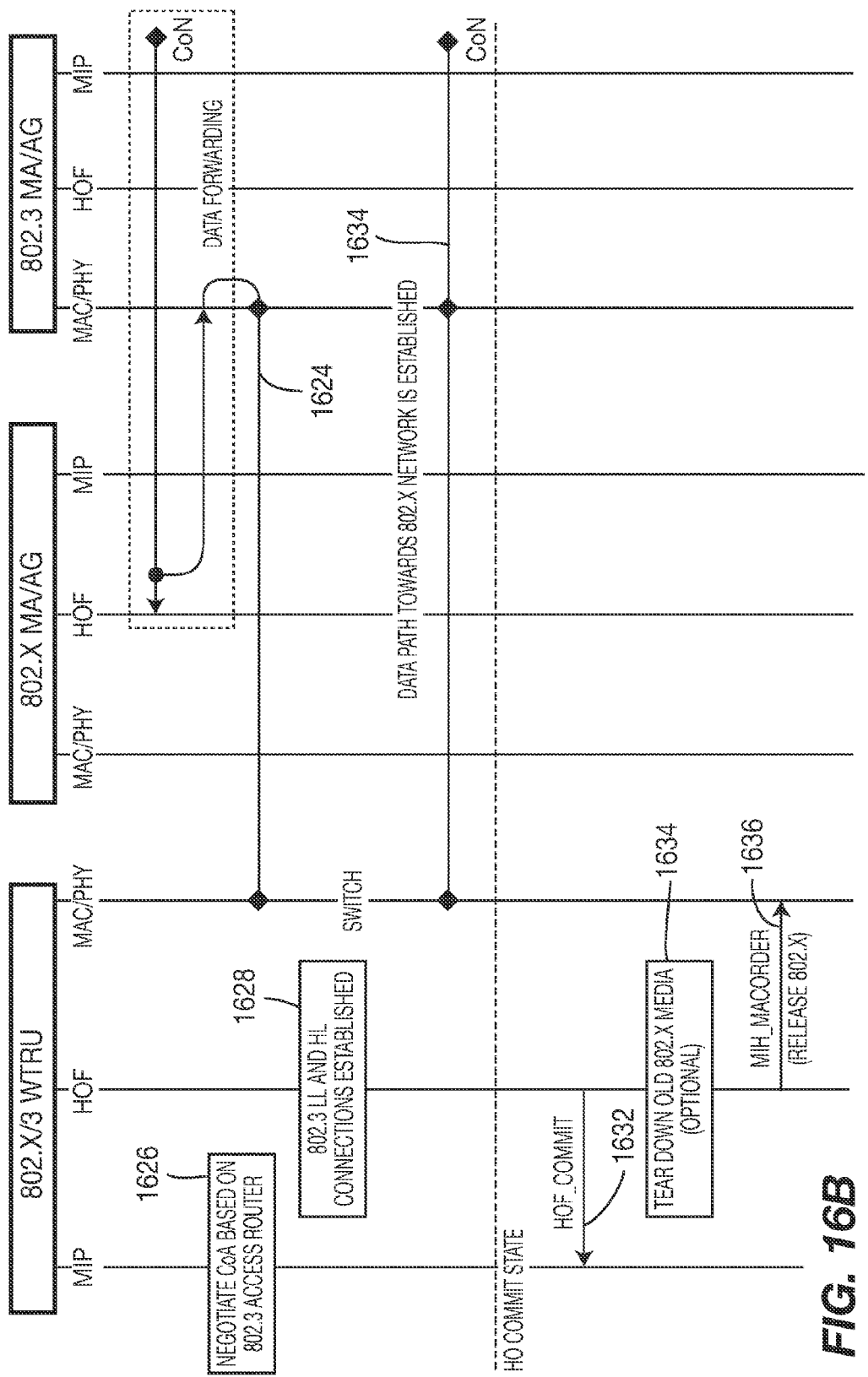

FIGS. 16A and 16B, taken together, show a process 1600 for WTRU initiated 802.X to 802.3 handover in accordance with the present invention. While a data path is established between the WTRU 110 and the IEEE 802.X network (step 1602), an 802.3 physical connection is established (step 1604) and the MIH detects the IEEE 802.3 physical connections (e.g., RJ45 cable has been plugged) (step 1606).

Upon detection of an 802.3 physical connection by lower layers, a MIH_PHY_EVENT message is sent towards the MIH handover function (step 1608). This message provides characteristics of the physical link that is used to determine whether a handover should be executed. A multi-stream connection, similar to a "layer 3 or IP-based soft-handover" (L3SH) may be attempted. This depends on a few factors, such as availability of A.C. power that renders battery considerations not applicable.

The MIH handover function continuously process and filters information provided by lower layers (step 1610) and performs handover evaluation to determine whether one or more condition satisfies criteria for triggering a handover procedure (step 1612).

If the determination is positive, the MIH handover function triggers handover procedures (step 1614). This includes transfer of context information, (e.g., header compression context, PPP context, or the like), and switching of user data. If L3SH is used, the context may be activated only after a new connection from the new router to the CoN 140 has been established. This information (L3SH support) needs to be communicated between the old and the new access router.

The MIH handover function uses an HOF_PREPARE message to trigger both context transfer and MIP procedures at the MIP component (step 1616). The WTRU 110 obtains a new IP address from the IEEE 802.3 AG using the newly established physical connection (step 1618). Either using information coming from the HOF_PREPARE message or using existing MIP message, the WTRU 110 obtains the IP address of the new AG, (i.e., 802.3 AG). This allows the WTRU 110 to contact the IEEE 802.3 AG to initiate context transfer procedures (step 1620).

While context is being transferred to the new AG, (802.3 AG), (step 1622), data is forwarded from the old AG (802.X AG) (step 1624). This allows the WTRU 110 to receive user data before a new CoA is negotiated with the new 802.3 access router (within the IEEE 802.3 AG). The new AG needs to determine whether the context engine needs to be activated or the data stream should simply be relay from/to the WTRU 110. This can be done based on the L3SH information provided by the old router.

The WTRU 110 negotiates a new CoA using existing MIP messages (step 1626). As the new CoA is ready and the lower layer connection is established (step 1628), the user data path can now be switched from the CoN 140 to the new AG (step 1630). User data is fully is now flowing entirely through the IEEE 802.3 network.

An HOF_COMMIT message is sent to inform the MIP layer that the old CoA can now be de-registered (step 1632). The MIH tears down the IEEE 802.X connection though an MIH MACORDER message (steps 1634, 1636). Optionally, the MIH may maintain the old 802.X connection to avoid re-associating procedures, when a handover back to 802.X should be performed.

Figure 17A:
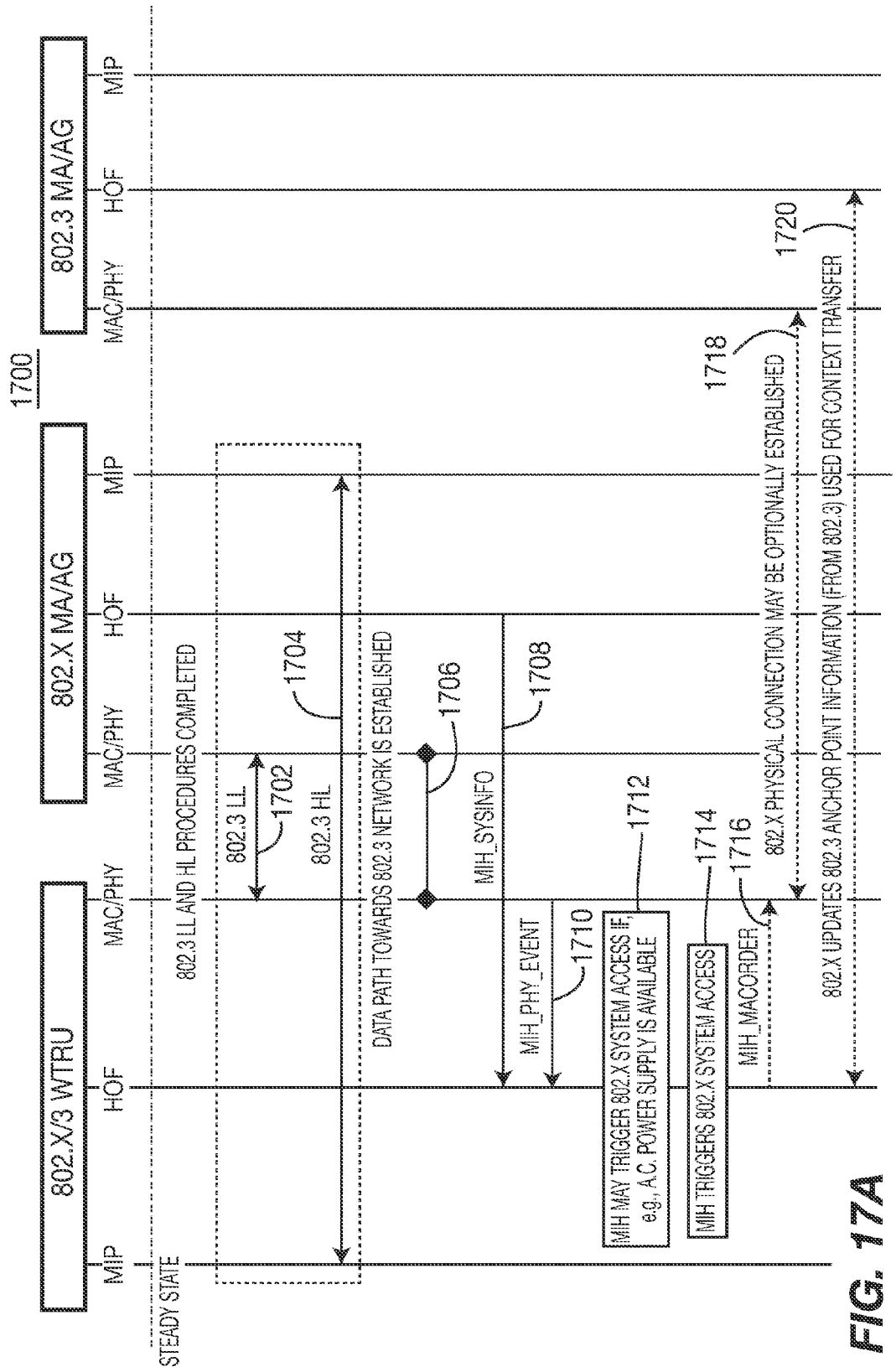
FIGS. 17A and 17B, taken together, show a process for WTRU initiated 802.3 to 802.X handover in accordance with the present invention.
Figure 17B:
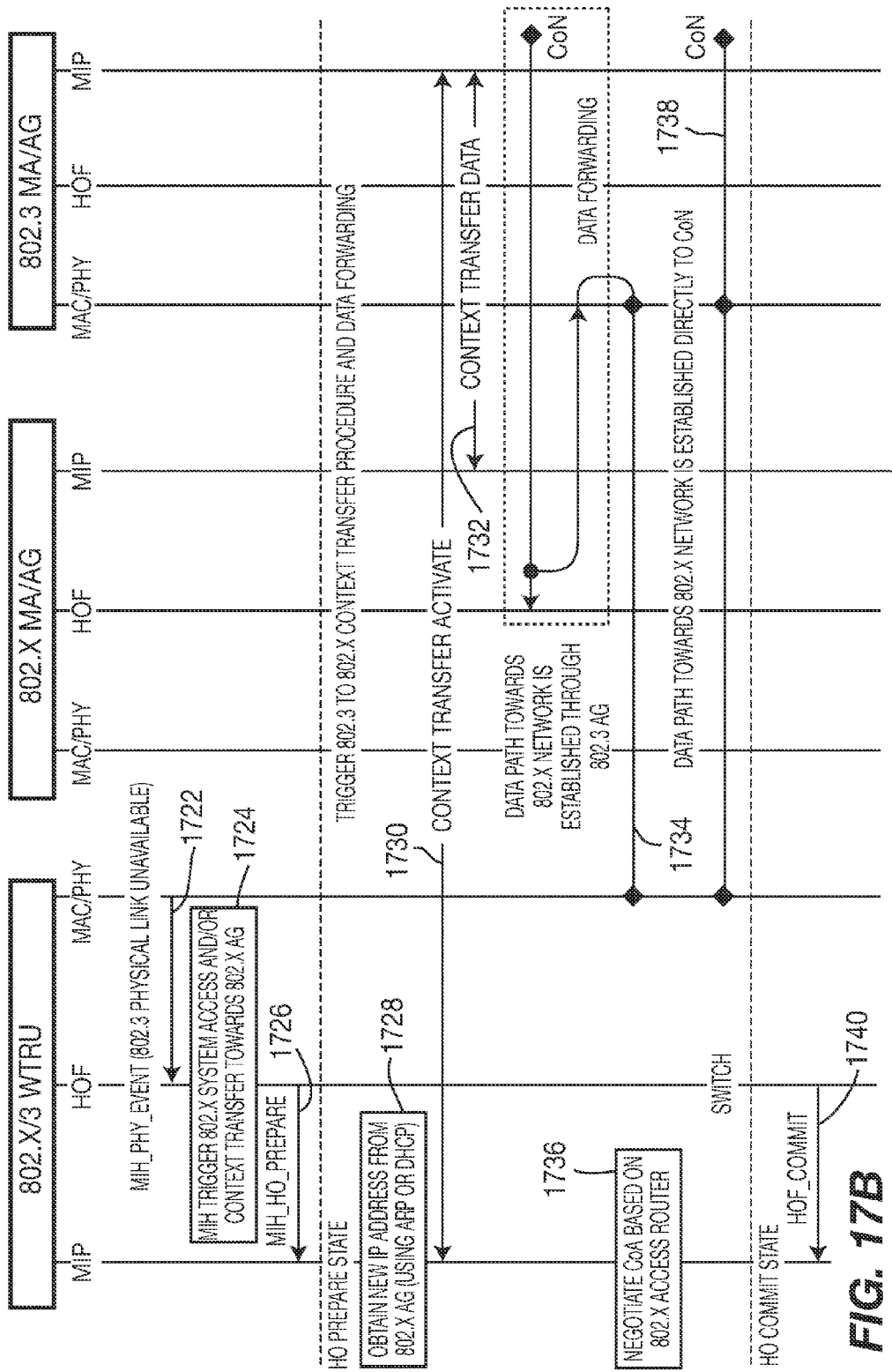

FIGS. 17A and 17B, taken together, show a process 1700 for WTRU initiated 802.3 to 802.X handover in accordance with the present invention. As an 802.3 connection is established, both lower layers (MAC/PHY) and higher layers, (e.g., IP/MIP) connections are established (step 1702, 1704). User data is flowing between the IEEE 802.3 WTRU and 802.3 network (step 1706). MIH system information may be provided to the MIH handover function (step 1708).

The MIH processes the MIH_PHY_EVENT message (step 1710). Some events, such as availability of A.C. power supply, may cause the MIH trigger simultaneous connection of both 802.3 and 802.X (step 1712). If the MIH handover function determines to trigger handover to 802.X system (step 1714), the MIH handover function issues an MIH_MACORDER message triggering association and authentication procedures (step 1716). An 802.X physical connection may be optionally established (step 1718). In order to facilitate transfer of context information, the WTRU 110 may optionally provide information about the current 802.3 anchor point (step 1720). An 802.3 anchor point is defined as the IEEE 802.3 AG holding context information for the current IEEE 802.3 connection. This information is used by the IEEE 802.X AG to request context transfer should a handover be imminent.

When the IEEE 802.3 connection is no longer available, (e.g., RJ45 cable is un-plugged), an event is triggered by the lower layers through a MIH_PHY_EVENT message (step 1722). The MIH function evaluates the conditions that might have generated the trigger, (e.g., link is down), and it determines that an 802.X system access, (if the WTRU 110 is not already associated), and a request for transfer of context information should be issued (step 1724).

The MIH handover function uses an HOF_PREPARE message to alert the MIP entity that a new AN should be initiated (step 1726). This triggers transfer of context information and forwarding of user data from the old AG (803.2) to the new AG (802.X).

The WTRU 110 obtains a new IP address from the IEEE 802.X AG using ARP or DHCP (step 1728). This step may be executed earlier. This may happen when the WTRU 110 is first associated and authenticated with the IEEE 802.X AG. Once the IEEE 802.X IP address is available, the WTRU 110 triggers the context transfer procedure and the data forwarding procedure from the old 802.3 AG to the new 802.X AG (steps 1730, 1732). If L3SH is used, the context may be activated only after a new connection from the new router to the CoN 140 has been established. This information (L3SH support) needs to be communicated between the old and the new access router.

While context is being transferred to the new AG (802.X AG), data is forwarded from the old AG (802.3 AG) (step 1734). This allows the WTRU 110 to receive user data before a new CoA is negotiated with the new 802.X access router (within the IEEE 802.X AG). The new AG needs to determine whether the context engine needs to be activated or the data stream should simply be relayed from/to the WTRU 110. This can be done based on the L3SH information provided by the old router.

The WTRU 110 then negotiates new CoA using existing MIP messages (step 1736). As the new CoA is ready and the lower layers connection is established, the user data path can now be switched from the CoN 140 to the new AG (step 1738). An HOF_COMMIT message is sent to inform the MIP side that the old CoA can now be de-registered (step 1740).

Figure 18A:
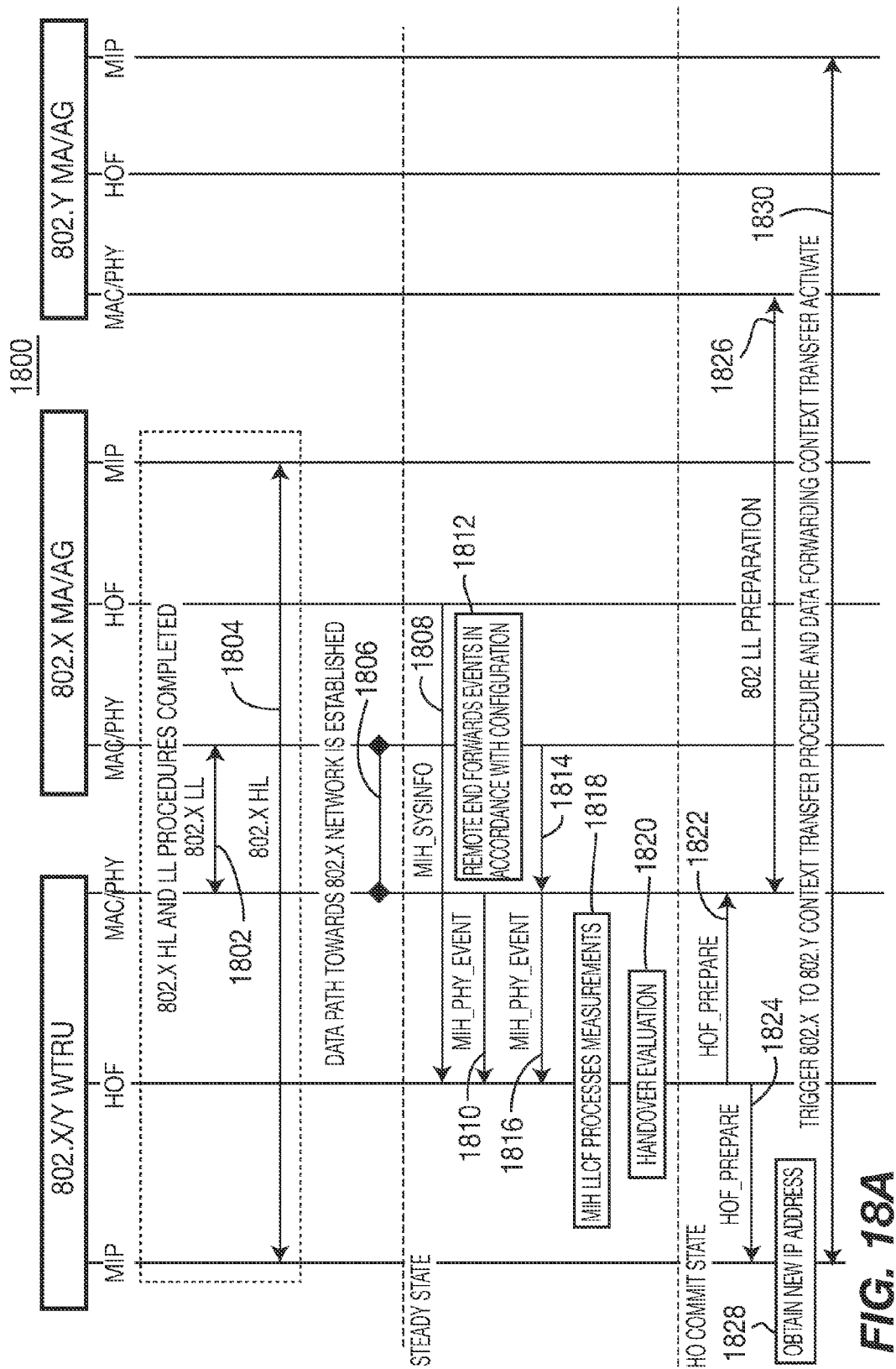
FIGS. 18A and 18B, taken together, show a process for initiated and WTRU controlled inter-802 handover in accordance with the present invention.
Figure 18B:
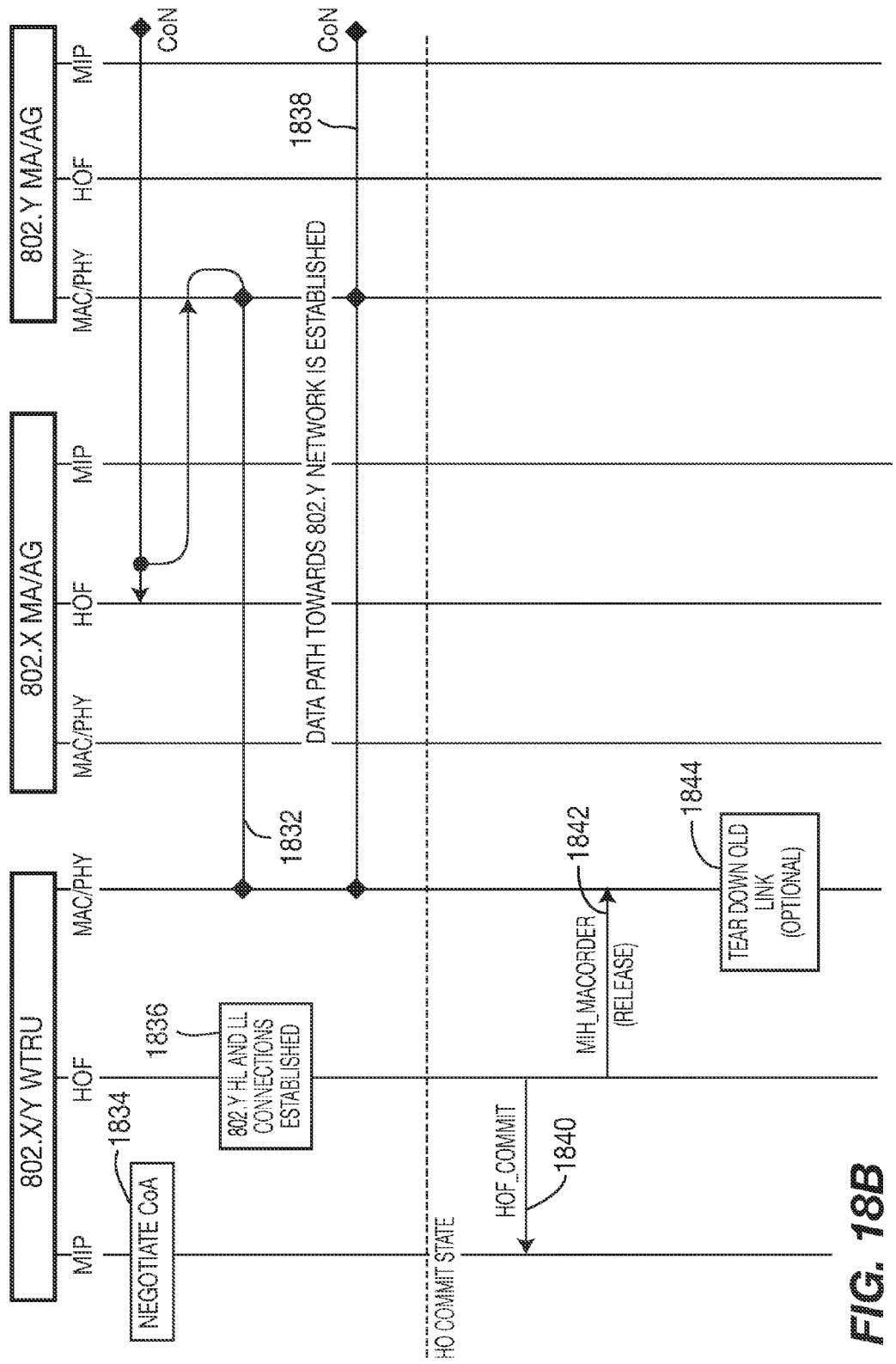

FIGS. 18A and 18B, taken together, show a process 1800 for WTRU initiated and WTRU controlled inter-802 handover in accordance with the present invention. As 802.X lower layer and higher layer procedures are completed (steps 1802, 1804), a data path with the IEEE 802.X network is established (step 1806). During the IEEE 802.X session in progress, the data path is between the WTRU 110 and the IEEE 802.X AN. The MIH at the IEEE 802.X network may optionally provide system information to its peer (step 1808). Information regarding potential neighbors can be optionally provided peer to peer via the MIH_SYSINFO message.

Measurements of MAC/PHY are sent to the MIH function via MIH_PHY_EVENT (step 1810). Remote measurements can also be forwarded to the WTRU 110 (steps 1812, 1814, 1816). An MIH LLCF processes the measurements (step 1818). For example, the MIH LLCF can average some measurements and compare them with thresholds and create triggers to indicate HOF.

The HOF 324 decides if handover is necessary based on the information it gets from network information services and measurement reports (step 1820). In order to make intelligent decision, the MIH handover function maintains information from system information update, (e.g., the neighbor list and neighbor networks' information). The MIH handover function makes preventive handover decisions in two steps, preparation and commit. Different thresholds and decision making algorithms may be used for these two steps.

If the MIH decides a handover is imminent, the MIH triggers a handover preparation procedure across the network by sending HOF_PREPARE messages to both MIP and MAC/PHY (steps 1822, 1824). Both MIP and layer 2 start to prepare for handover. The WTRU 110 establishes a new layer 2 link with the IEEE 802.Y network (step 1826).

The WTRU 110 obtains a new IP address from the IEEE 802.X network (step 1828). This step may happen earlier. The WTRU MIP triggers context transfer from the IEEE 802.X network to the IEEE 802.Y network (step 1830). While the context is transferred to the IEEE 802.Y network, the data can be forwarded from the IEEE 802.X AG to the IEEE 802.Y AG (step 1832). This allows the WTRU 110 to receive user data before a new CoA is negotiated with the IEEE 802.Y router.

The WTRU 110 negotiates a new CoA using existing MIP messages (step 1834). As the new CoA is ready and the lower and higher layers connections are established (step 1836), the user data path now is switched to the IEEE 802.Y network (step 1838).

A HOF_COMMIT message is sent to inform the MIP side that the old CoA can be deregistered (step 1840). Optionally, the old layer 2 connection can be torn down by MIH_MACORDER message (steps 1842, 1844).

Figure 19A:
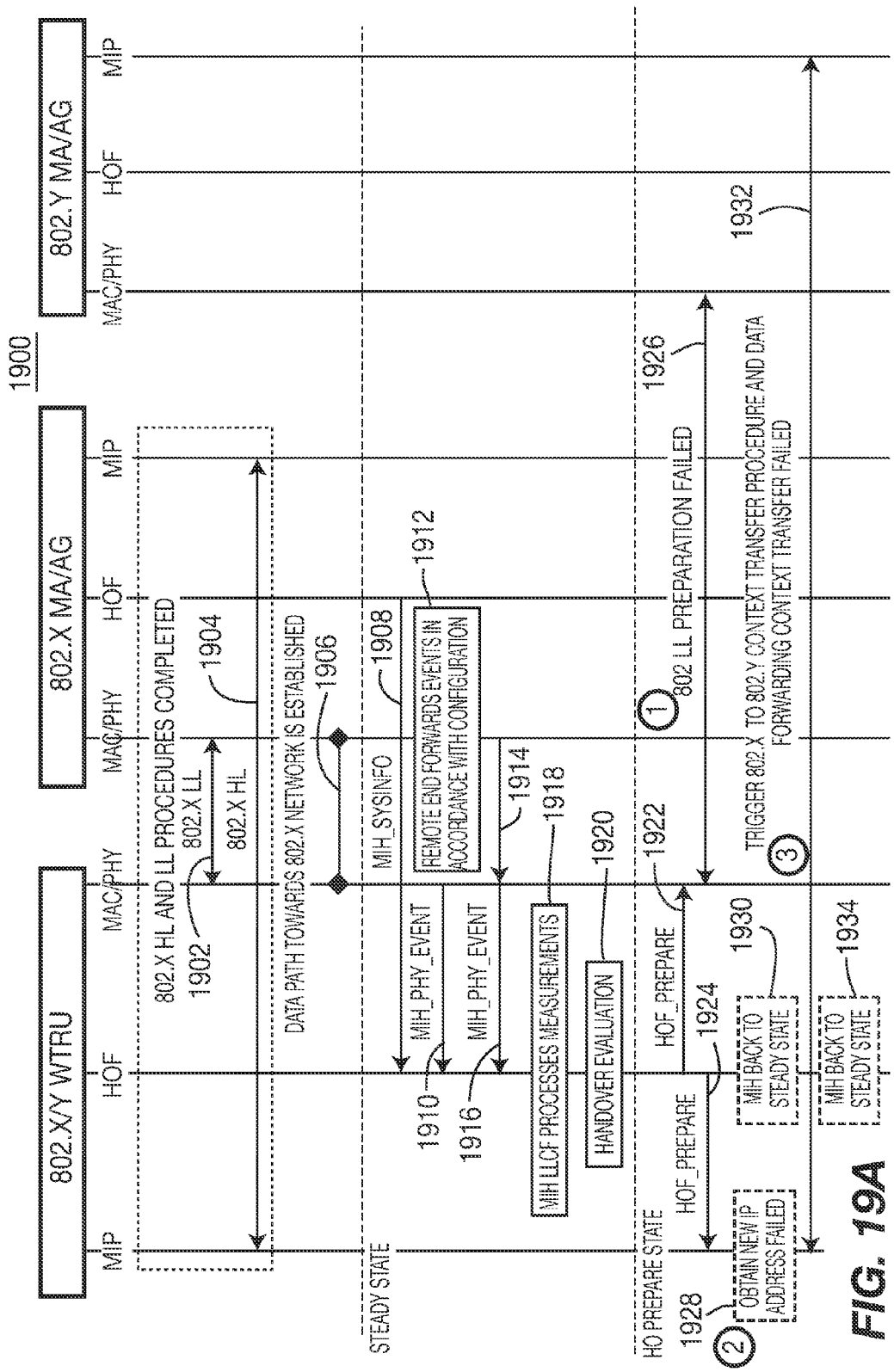
FIGS. 19A and 19B, taken together, show a process for WTRU initiated and WTRU controlled inter-802 handover failure case in accordance with the present invention.
Figure 19B:
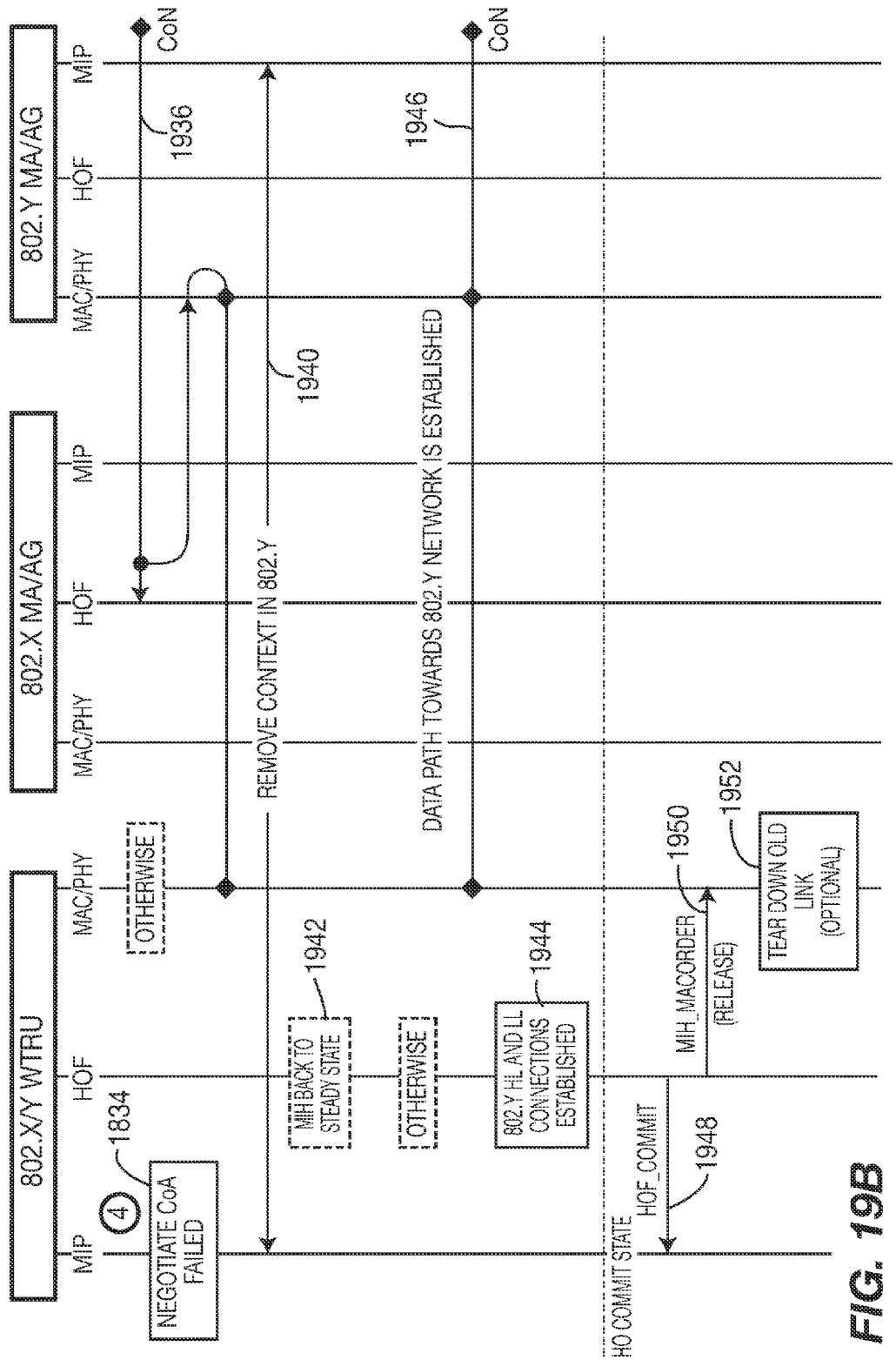

FIGS. 19A and 19B, taken together, show a process 1900 for WTRU initiated and WTRU controlled inter-802 handover failure cases. The failure can happen at many phases. As 802.X lower layer and higher layer procedures are completed (steps 1902, 1904), a data path with the IEEE 802.X network is established (step 1906). The MIH at the IEEE 802.X network may optionally provide system information to its peer (step 1908). Measurements of MAC/PHY are sent to the MIH function via MIH_PHY_EVENT (step 1910). Remote measurements can also be forwarded to the WTRU 110 (steps 1912-1916). An MIH LLCF processes the measurements (step 1918). The MIH handover function decides if handover is necessary based on the information it gets from network information services and measurement reports (step 1920). If the MIH decides a handover is imminent, the MIH triggers a handover preparation procedure across the network by sending HOF_PREPARE messages to both MIP and MAC/PHY (steps 1922, 1924). Both MIP and layer 2 start to prepare handover.

If the layer 2 link to the IEEE 802.Y network cannot be established (step 1926), the lower layer optionally informs the MIH of the failure, or a timer will expire. The MIH then goes back to the steady state. When MIH sends HOF_PRE-PARE to higher layer (step 1924), the WTRU 110 tries to obtain a new IP address from the IEEE 802.X network. If the WTRU 110 fails to obtain a new IP address (step 1928), the lower layer may inform the MIH of the failure, or a timer will expire. The MIH then goes back to the steady state (step 1930).

If all the above succeeds, the WTRU MIP triggers context transfer from the IEEE 802.X network to the IEEE 802.Y network (step 1932). If the context transfer fails, the MIH goes back to the steady state (step 1934). Optionally, the MIH may tear down the layer 2 link to the IEEE 802.Y network. If the context is successfully transferred to the IEEE 802.Y network, the data can be forwarded from the IEEE 802.X AG to the IEEE 802.Y AG (step 1936). This allows the WTRU 110 to receive user data before a new CoA is negotiated with the IEEE 802.Y router.

If the WTRU 110 fails to negotiate a new CoA using existing MIP messages (step 1938), the transferred context in 802.Y should be deleted (step 1940). Assuming that the context in the IEEE 802.X still exists, the data forwarding should be stopped. The MIH then goes back to the steady state (step 1942). If the new CoA is ready and the lower and higher layers connection is established (step 1944), the user data path now is switched to the IEEE 802.Y network (step 1946).

An HOF_COMMIT message is sent to inform the MIP side that the old CoA can be de_registered (step 1948). Optionally, the old layer 2 connection can be torn down by MIH_MA-CORDER message (steps 1950, 1952).

Figure 20A:
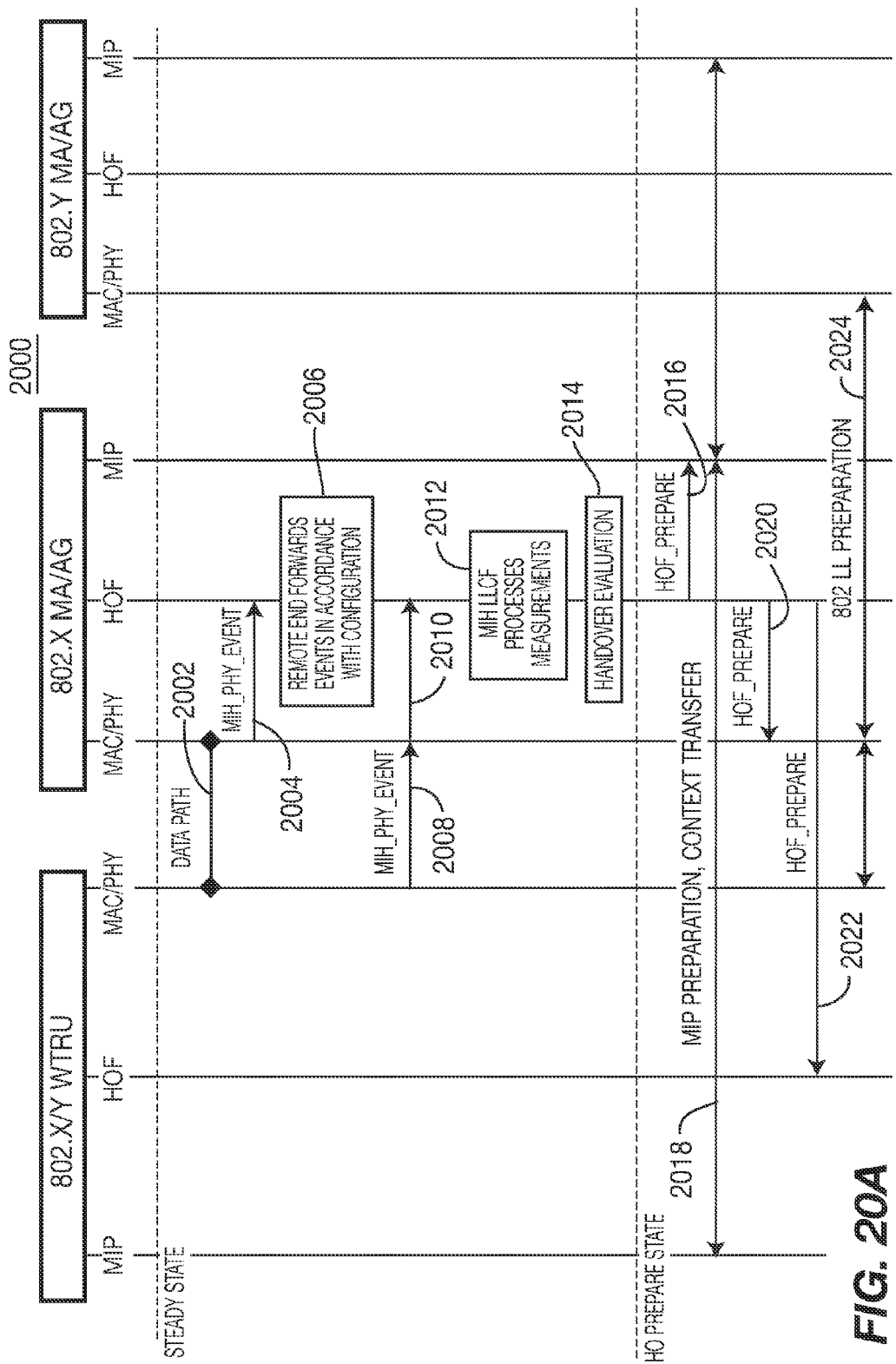
FIGS. 20A and 20B, taken together, show a process for network initiated and network controlled inter-802 handover in accordance with the present invention.
Figure 20B:
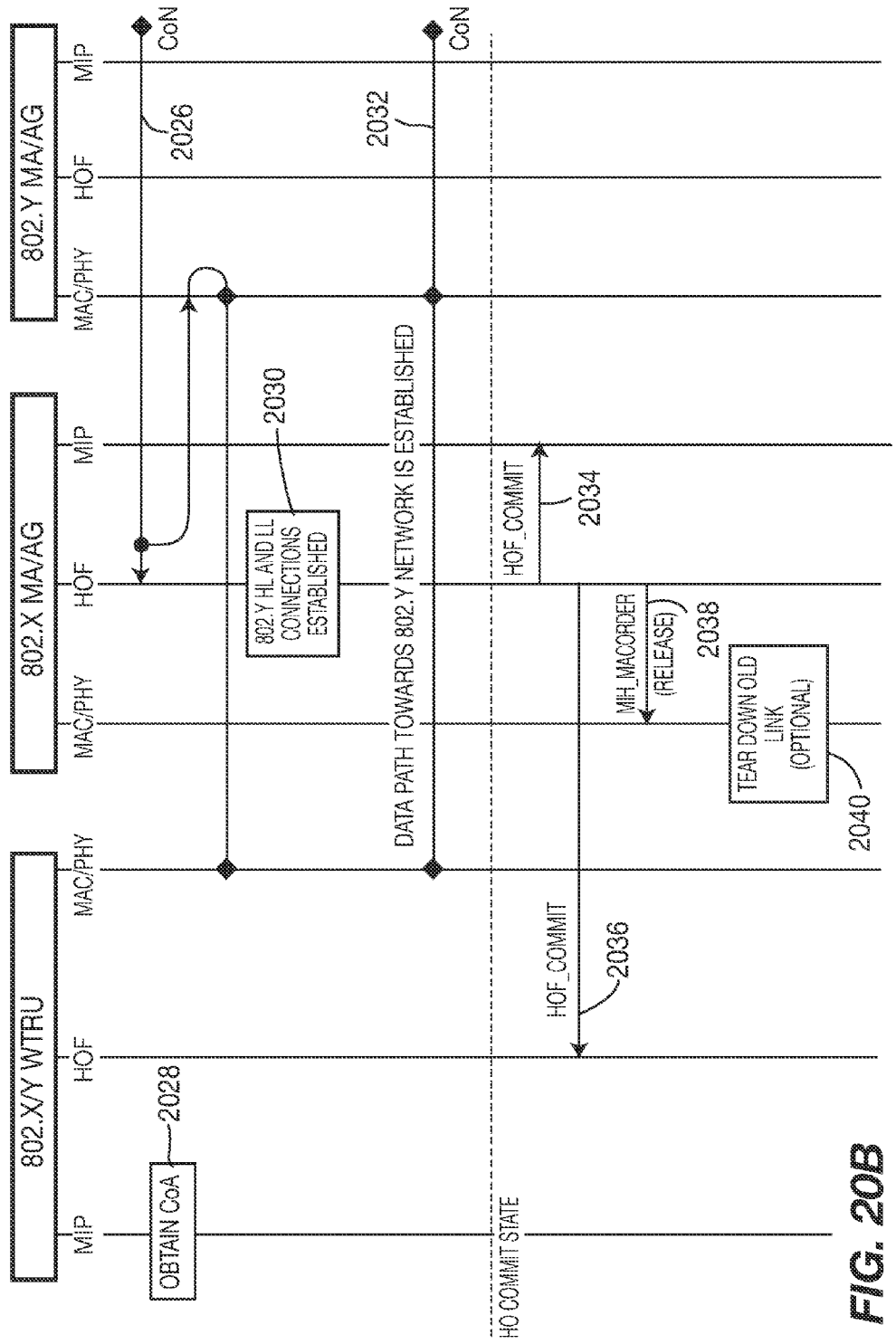

FIGS. 20A and 20B, taken together, show a process 2000 for network initiated and network controlled inter-802 handover in accordance with the present invention. While an 802.X session is in progress, the data path is between the WTRU 110 and the IEEE 802.X AN (step 2002). Measurements of MAC/PHY are sent to the MIH function in the IEEE 802.X AN via an MIH_PHY_EVENT message (step 2004). Remote measurements from the WTRU 110 can also be forwarded to the IEEE 802.X network (steps 2006-2010).

The MIH LLCF processes the measurements (step 2012). For example, the MIH LLCF can average some measurements and compare them with thresholds and create triggers to indicate MIH handover function. The MIH handover function decides if handover is necessary based on the information it gets from network information services and measurement reports (step 2014). In order to make intelligent decisions, the MIH handover function maintains information from system information update, (e.g., the neighbor list and neighbor networks' information). The MIH handover function makes preventive handover decisions in two steps, preparation and commit. Different thresholds and decision-making algorithms can be used for these two steps.

If the MIH handover function decides a handover is imminent, it triggers handover preparation procedures across the network by sending HOF_PREPARE messages to both MIP and MAC/PHY (steps 2016, 2020). Both MIP and layer 2 start to prepare handover. At higher layer, the IEEE 802.X AG transfers the MIP context to the IEEE 802.Y AG, and at layer 2, the WTRU 110 establishes a new layer 2 link with the IEEE 802.Y network (step 2018). A peer-to-peer message is sent from the MIH handover function in the IEEE 802.X AN to the MIH handover function at the WTRU 110 (step 2022) and the WTRU prepares lower layer connection with the IEEE 802.Y network (step 2024).

While context is transferred to the IEEE 802.Y network, the data can be forwarded from the IEEE 802.X AG to the IEEE 802.Y AG (step 2026). This allows the WTRU 110 to receive user data before a new CoA is negotiated with the IEEE 802.Y router. The WTRU 110 negotiates a new CoA using existing MIP messages (step 2028). As the new CoA is ready and the lower layers connection is established, the user data path now is switched to the IEEE 802.Y network (steps 2030, 2032).

The MIH handover function continues to process information and checks if a handover should be committed. When a HO decision is made by the MIH handover function, it sends a HOF_COMMIT message to the MIP (step 2034). The trigger is also sent to the MIH peer in the WTRU 110 (step 2036). Upon receiving the MIH handover commit command, the old CoA can be deregistered. Optionally, the MIH handover function may send MIH_MACORDER to tear down the old layer 2 connection (steps 2038, 2040).

The present invention implements the Fast Handover Protocol in MIH. One of the objectives of the Fast Handover Protocol is to overcome the latency due to MIP registration, and the basic idea is to anticipate movement with the help of link layer (triggers). This implies preparing the network in advance and requires anticipated handover initiated by the WTRU 110 and the network. This is achieved by commencing the registration process slightly before the actual handover.

Figure 21:
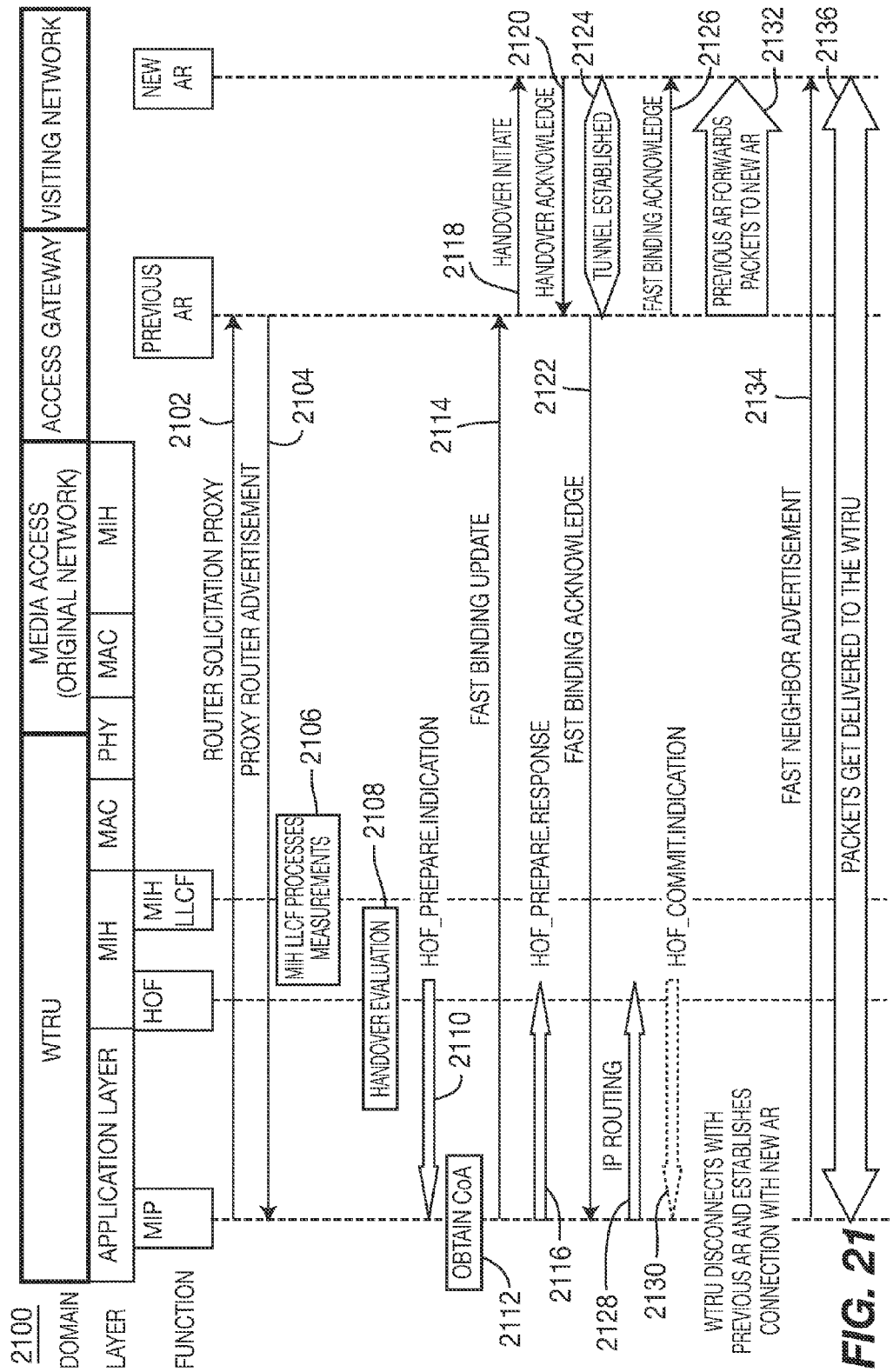
FIG. 21 shows a process for WTRU initiated inter-802 fast handover in accordance with the present invention.

FIG. 21 shows a process 2100 for WTRU initiated inter-802 fast handover in accordance with the present invention. The WTRU 110 requests information about its neighbors by router solicitation proxy (step 2102). This is used to build an internal list of neighboring APs at the WTRU 110. The WTRU 110 receives information pertaining to its surrounding APs, (such as IP and MAC addresses, operating frequency and ESSID information), via a router advertisement message (step 2104). The WTRU 110 forwards that information to the MIH via a pre-established link between MIH and MIP (not shown).

The MIH LLCF processes measurements (step 2106) and the MIH handover function performs handover evaluation (step 2108). If the MIH handover function decides to handover, the MIH handover function sends an MIH_HAN-DOVER_PREPARE trigger to MIP entity (step 2110), which is acknowledged by MIH_HANDOVER_PREPARE response message (step 2116). The WTRU 110 obtains a new CoA (step 2112).

A fast binding update (FBU) is a message from the WTRU 110 instructing its (previous) AR to start directing its traffic to the new AR. The FBU is constructed using information extracted from the router advertisement message and is sent after receiving the MIH_HANDOVER_PREPARE.Indication (step 2114). The object of the FBU message is to authorize the previous AR to bind the (previous) CoA to the new CoA Having received a FBU, the previous AR starts the procedures for handover and tunnel creation. A handover initiate message, which is Internet Control Message Protocol (IC-MPv6) message, is sent by the previous AR to the new AR to trigger the process of the handover (step 2118). A handover acknowledge (HACK) is an ICMPv6 message that is sent by the new AR to the previous AR as a reply to the handover initiate message (step 2120). A Fast Binding Acknowledge (FBACK) message is sent by the previous AR to the new AR to acknowledge receipt of the FBU message after the previous AR receives the HACK from the New AR and to the WTRU 110 for information purposes, (steps 2122, 2126). The temporary tunnel is established between the previous AR and the new AR (step 2124).

IP routing information is sent from the MIP entity to the MIH handover function (step 2128) and the MIH handover function sends a MIH_HANDOVER_COMMIT message to the MIP entity and the WTRU 110 disconnects with the previous AR (step 2130). The previous AR then starts forwarding packets to new AR (step 2132). In order to announce itself to the new AR, and as soon as the WTRU 110 re-gains connectivity, the WTRU 110 sends a Fast Neighbor Advertisement (FNA) message to the new AR (step 2134). The handover is complete and packets are now delivered to the WTRU 110 from the new AR (step 2136)

Figure 22:
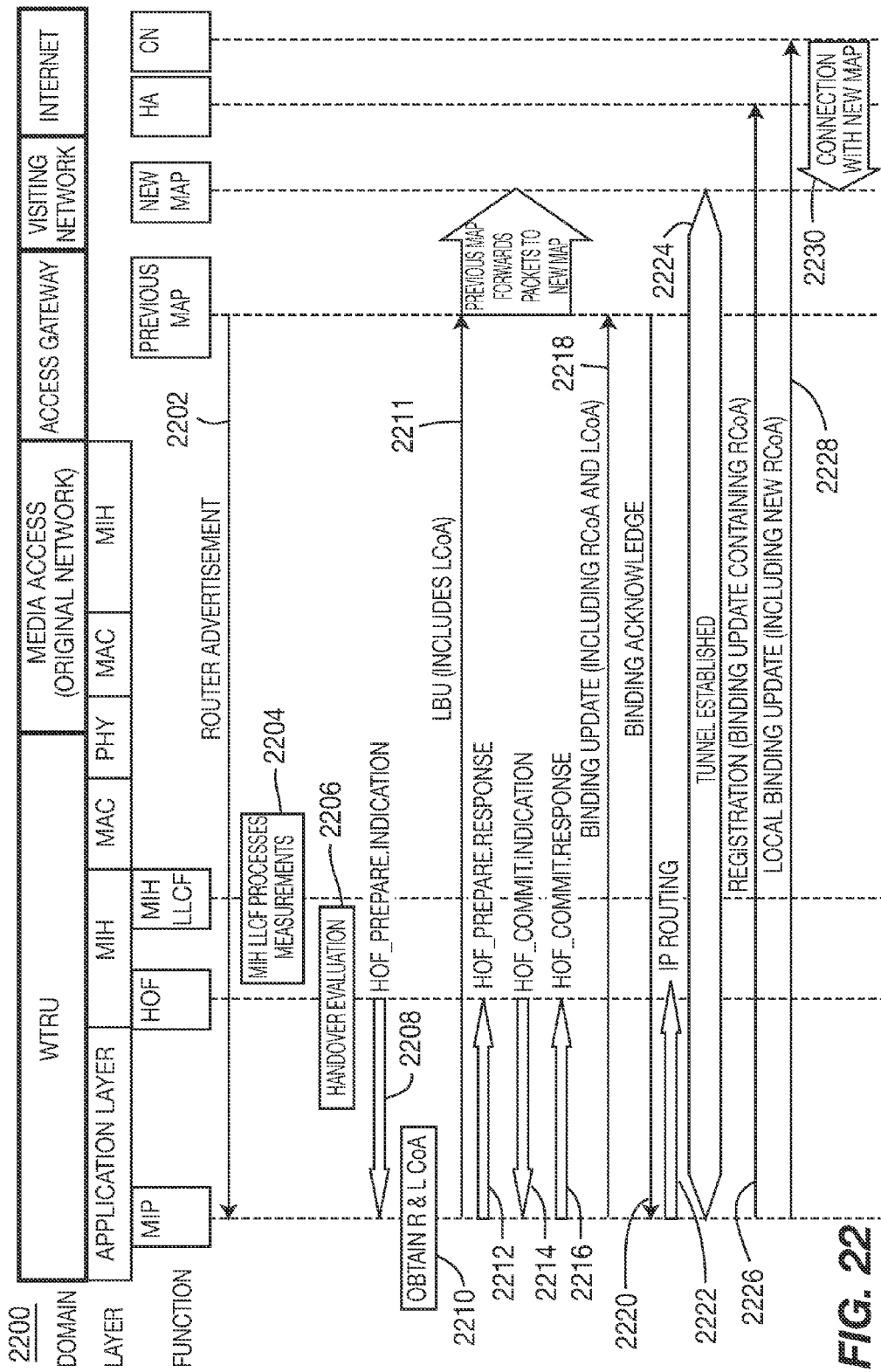
FIG. 22 shows a process for implementing hierarchical MIPv6 (HMIPv6) using a WTRU initiated inter-802 fast handover message flow in accordance with the present invention.

FIG. 22 shows a process 2200 for implementing Hierarchical MIPv6 (HMIPv6) using an inter-802 fast handover message flow in accordance with the present invention. This provides localized mobility management for reducing signaling load and handover latency. The concept of global mobility refers to a situation where the WTRU 110 moves from one mobile anchor point (MAP) to another, thus changing its regional care of address (RCoA). A typical scenario of a local mobility case is an WTRU 110 moving within the same MAP region, but changing from one AR to another. These types of local handovers are managed locally and transparently to WTRU's correspondent hosts.

A WTRU 110 receives a router advertisement from the new MAP to which it has moved (step 2202). The global address of the MAP is included in the advertisement. Based on the prefix received in the MAP option, the WTRU 110 forms the new RCoA specific to its MAP. The router advertisement, along with the WTRU's measurement results, is forwarded to the MIH via a pre-established link between MIH and MIP. The MIH LLCF analyses these measurements (step 2204). The MIH handover function performs handover evaluation (step 2206). The MIH handover function sends an HANDOVE_PREPARE.Indication trigger to the MIP if the MIH handover function determines that a handover is advantageous or necessary (step 2208) and it is acknowledged by a HANDOVER_PREPARE.Response message (step 2212). The WTRU 110 obtains CoAs, RCoA and On-Link Care of Address (LCoA) (step 2210).

Upon receiving the MIH_HANDOVER_PREPARE.Indication trigger, the MIP initiates a pre-binding procedure sending an LBU with the LcoA to the previous MAP (step 2211) to reduce packet loss and to perform a rapid handover. This is performed in consistent with the make-before-break principle. At this point, an MIH_HANDOVER_COMMIT.Indication trigger is sent by the MIH to the MIP (step 2214), which is acknowledged by an MIH_HANDOVER_COMMIT.Response message (step 2216).

The WTRU 110, having received the trigger indicating a handover, then sends a Binding Update (BU) to the new MAP (step 2218). This message includes a "Home Address" option that contains the RCoA. This BU binds the WTRU's RCoA to its LCoA.

The MAP sends a BACK to the WTRU 110 (step 2220) and the MIP entity sends an IP routing information to the MIH handover function (step 2222). A bi-directional tunnel is then established between the WTRU 110 and the new MAP (step 2224).

As soon as registration is confirmed with the new MAP, the WTRU registers its new RCoA with the HA by sending a BU specifying the biding to the HA 142 (step 2226).

This step is part of the MIPv6 route optimization method. A BU similar to that in the previous step is also sent to the WTRU's CoN 140 (step 2228). This allows the CoN 140 to establish a link with the new MAP for the purpose of transmitting packets directly to that new MAP (step 2230).

Although the features and elements of the present invention are described in the preferred embodiments in particular combinations, each feature or element can be used alone without the other features and elements of the preferred embodiments or in various combinations with or without other features and elements of the present invention.

What is claimed is:

1. A wireless transmit/receive unit (WTRU) comprising:
    a first media dependent entity configured to communicate via a first radio access technology (RAT);
    a second media dependent entity configured to communicate via a second RAT, wherein the first RAT is different than the second RAT; and
    an interworking entity configured to communicate with the first media dependent entity via a first service access point (SAP) using protocols specific to the first media dependent entity, and configured to communicate with the second media dependent entity via a second SAP using protocols specific to the second media dependent entity.

2. The WTRU of claim 1, wherein the interworking entity is configured to perform a handover of a communication session from the first media dependent entity to the second media dependent entity.

3. The WTRU of claim 1, wherein the first media dependent entity includes a medium access control (MAC) entity configured to communicate with the interworking entity via the first SAP.

4. The WTRU of claim 1, wherein the second media dependent entity includes a medium access control (MAC) entity configured to communicate with the interworking entity via the second SAP.

5. The WTRU of claim 1, wherein the interworking entity is configured to send a management message to the first media dependent entity via the first SAP.

6. The WTRU of claim 1, wherein the interworking entity is configured to send a management message to the second media dependent entity via the second SAP.

7. The WTRU of claim 1, wherein the interworking entity is configured to receive a handover event message from the first media dependent entity via the first SAP.

8. The WTRU of claim 1, wherein the interworking entity is configured to receive a handover event message from the second media dependent entity via the second SAP.

9. The WTRU of claim 1, wherein the first SAP includes a plurality of media dependent service primitives.

10. The WTRU of claim 1, wherein the second SAP includes a plurality of media dependent service primitives.

11. A method for use in a wireless transmit/receive unit (WTRU), the method comprising:
    communicating via a first radio access technology (RAT) using a first media dependent entity;
    communicating via a second RAT using a second media dependent entity, wherein the first RAT is different than the second RAT;
    communicating with the first media dependent entity via a first service access point (SAP) using an interworking entity using protocols specific to the first media dependent entity; and
    communicating with the second media dependent entity via a second SAP using the interworking entity using protocols specific to the second media dependent entity.

12. The method of claim 11, further comprising:
    performing a handover of a communication session from the first media dependent entity to the second media dependent entity using the interworking entity.

13. The method of claim 11, wherein the first media dependent entity includes a medium access control (MAC) entity, and the communicating with the first media dependent entity includes communicating with the MAC entity via the first SAP.

14. The method of claim 11, wherein the second media dependent entity includes a medium access control (MAC) entity, and the communicating with the second media dependent entity includes communicating with the MAC entity via the second SAP.

15. The method of claim 11, wherein the communicating with the first media dependent entity via the first SAP includes sending a management message to the first media dependent entity.

16. The method of claim 11, wherein the communicating with the second media dependent entity via the second SAP includes sending a management message to the second media dependent entity.

17. The method of claim 11, wherein the communicating with the first media dependent entity via the first SAP includes receiving a handover event message from the first media dependent entity.

18. The method of claim 11, wherein the communicating with the second media dependent entity via the second SAP includes receiving a handover event message from the second media dependent.

19. The method of claim 11, wherein the first SAP includes a plurality of media dependent service primitives.

20. The method of claim 11, wherein the second SAP includes a plurality of media dependent service primitives.

* * * * *

UNITED STATES PATENT AND TRADEMARK OFFICE
CERTIFICATE OF CORRECTION

| | |
|---|---|
| PATENT NO. | : 8,233,455 B2 |
| APPLICATION NO. | : 12/815031 |
| DATED | : July 31, 2012 |
| INVENTOR(S) | : Shaheen et al. |

It is certified that error appears in the above-identified patent and that said Letters Patent is hereby corrected as shown below:

ON THE TITLE PAGE

Item (57) ABSTRACT, page 1, right column, in the thirteenth line of this section, after "to each", delete "to" and insert --of--.

Item (56) U.S. PATENT DOCUMENTS, page 2, left column, in the thirty-seventh line, after "2001/0034233 A1 10/2001 Tiedemann" insert --Jr.--.

Item (56) OTHER PUBLICATIONS, page 3, left column, in the sixty-fifth line, after ""Steps in L2 and L3 Handoffs." Jan. 2004.", delete "IEE" and insert --IEEE--.

Item (56) OTHER PUBLICATIONS, page 4, right column, in the fourteenth line, after "V6.5.0", delete "(Sep." and insert --(Jun.--.

IN THE CLAIMS

At Claim 18, column 22, line 8, after "media dependent", insert --entity--.

Signed and Sealed this
Ninth Day of April, 2013

Teresa Stanek Rea
*Acting Director of the United States Patent and Trademark Office*